(12) United States Patent
Müller-Hartburg

(10) Patent No.: US 6,260,326 B1
(45) Date of Patent: *Jul. 17, 2001

(54) WALL OR FLOOR TILE

(76) Inventor: Johannes Müller-Hartburg, Adolf-Radlgasse 1, Untertullnerbach (AT), A-3011

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,110

(22) Filed: Mar. 22, 1997

Related U.S. Application Data

(63) Continuation-in-part of application No. PCT/IB95/00787, filed on Sep. 22, 1995.

(30) Foreign Application Priority Data

Aug. 24, 1995 (AT) .................................. 1800/94
Sep. 22, 1995 (AT) .................................. 1799/94
Sep. 22, 1995 (CH) .................................. 2257/95

(51) Int. Cl.$^7$ .............................. E04C 2/04; E04F 13/00; E04F 15/00; C04B 28/32

(52) U.S. Cl. .................................. 52/601; 52/390; 52/455; 52/762; 52/780; 52/782.1; 52/700; 52/742.14; 264/267; 264/274

(58) Field of Search .................................. 52/601, 800.11, 52/800.12, 802.1, 439, 455, 432, 434, 435, 309.1, 309.7, 309.16, 699, 700, 390, 474, 262, 318, 780, 782.1, 344; 264/267, 274; 428/14, 33, 45

(56) References Cited

U.S. PATENT DOCUMENTS

| | | | |
|---|---|---|---|
| 530,817 | * | 12/1894 | Aumont ........................ 264/267 X |
| 862,956 | * | 8/1907 | Wolle ........................ 52/455 |
| 1,098,792 | * | 6/1914 | Ficklen ........................ 52/601 X |
| 1,565,597 | * | 12/1925 | Spiesbach ........................ 52/455 |
| 2,005,301 | * | 6/1935 | Rafter ........................ 52/601 X |
| 2,030,556 | * | 2/1936 | Veltung . |
| 2,055,804 | * | 9/1936 | Rafter ........................ 52/601 X |
| 2,115,936 | * | 5/1938 | Sterns ........................ 52/601 |
| 2,179,289 | * | 11/1939 | Galassi ........................ 52/318 |
| 2,184,146 | * | 12/1939 | Leguillon ........................ 52/601 X |
| 2,247,157 | * | 6/1941 | Little ........................ 264/274 |
| 2,334,113 | * | 11/1943 | Malarkey ........................ 52/455 |
| 3,394,523 | * | 7/1968 | Sackett ........................ 52/601 X |
| 3,604,174 | * | 9/1971 | Nelson ........................ 52/601 |
| 3,848,034 | * | 11/1974 | Schaefer ........................ 264/274 X |
| 3,936,987 | * | 2/1976 | Calvin ........................ 52/309.1 |
| 4,312,674 | * | 1/1982 | Stalego et al. . |
| 4,409,768 | * | 10/1983 | Boden ........................ 52/742.13 X |
| 4,419,133 | * | 12/1983 | Shubow et al. . |
| 4,424,968 | * | 1/1984 | Smith ........................ 52/800.12 |
| 4,752,517 | * | 6/1988 | Beitel ........................ 52/800.12 |
| 4,776,556 | * | 10/1988 | Dingler ........................ 52/309.16 X |
| 4,932,182 | * | 6/1990 | Thimasson ........................ 52/601 X |
| 5,022,205 | * | 6/1991 | Ford ........................ 52/309.7 X |
| 5,049,197 | * | 9/1991 | Brwon . |
| 5,529,819 | * | 6/1996 | Campi ........................ 428/14 |
| 5,609,937 | * | 3/1997 | Reinstad ........................ 428/122 |

FOREIGN PATENT DOCUMENTS

| | | |
|---|---|---|
| 317 074 | 11/1973 | (AT) . |
| 358 454 | 11/1974 | (AT) . |
| 345 149 | 12/1977 | (AT) . |
| 379 133 | 6/1978 | (AT) . |
| 25 22 515 B2 | 5/1975 | (DE) . |
| 33 40 949 C2 | 11/1984 | (DE) . |

\* cited by examiner

*Primary Examiner*—Robert Canfield

(57) ABSTRACT

A floor tile or wall tile in the form of a panel has a frame and a filling. The frame and the filling are nondetachably connected in a utility state to form an integral part. The connection between frame and filling interlocks tongue and groove-like. The frame extends beyond the filling in the plane of the tile at least the thickness of the frame. The filling is of the same thickness as the frame.

21 Claims, 12 Drawing Sheets

WALL OR FLOOR TILE

This is a Continuation-In-Part of International Application PCT/IB95/00787 with an international filing date of Sep. 22, 1995, now abandoned. The original German text of PCT/IB95/00787, WO96/09262, laid open Mar. 28, 1996, is incorporated herein by reference.

This patent application relates to a novel, panel-like covering or article, its formulation and preparation from a hydraulically setting material, preferably a magnesia cement material, the production of a prefabricatable thin (about 1 cm) panel and a panel-like floor covering, wall covering or furniture covering, This should be easy to process and, in the final quality, capable of being ground and polished. When used, it should form a spot-free, impermeable and, as far as possible, abrasion-resistant, highly aesthetic covering which meets high requirements.

Magnesia cement materials have already been disclosed in connection with the manufacture of panels. They were used primarily for manufacturing building boards, which however were unsuitable for use on the floor because they had insufficient strength. An example of such a building board is described in AT-B-358454. This document also gives a list of known processes according to the prior art which are considered to have been disclosed for the purposes of this application (page 2, lines 5–46).

AT-B-317074 describes light-weight wood wool building boards. DE-C-3340949 discloses mineral fibre ceiling panels and U.S. Pat. No. 4,419,133 and U.S. Pat. No. 5,049,197 relate to magnesium-bound panel structures which in theory can also be used for floor panels but whose properties achieved by the respective mixture, especially with regard to suitable durability, are not optimal in the living and kitchen area.

Moreover, what is important in the living area is not only the durability but also to a great extent aesthetic effects, which are to be achieved by suitable technical measures.

The preparation of magnesia cement concretes either with or without organic fillers, such as, for example, wood chips (magnelite composition), with or without inorganic fillers, such as ground rocks and powdered minerals and grain mixtures, has been known for about 100 years. The base is a binder comprising reactive magnesia and a solution of magnesium salts, preferably of magnesium chloride ($MgCl_2$).

The setting process is known to consist in dissolution of the oxide in the magnesium chloride lye and subsequent crystallization of a hydrated magnesium oxychloride of the formula $3MgO \cdot MgCl_2 \cdot 11H_2O$. Experience has shown that this proportion should be slightly exceeded so that rather a small MgO excess is present instead of the strongly hygroscopic $MgCl_2$. MgO itself is practically insoluble in water but is transformed in the course of time into magnesium hydroxide, which in turn forms a magnesium carbonate under the action of atmospheric carbon dioxide. The hydrated magnesium oxychloride is slightly soluble in water so that, in the case of such a known mixture, the magnesia cement is not water-resistant.

An attempt to improve the water resistance was made according to AT-B-379133, which proposed adding ethyl silicate. Although such a mixture has improved water resistance compared with earlier mixtures, it is still not optimal. Moreover, it is not possible to rule out the possibility that the addition of ethyl silicate would adversely affect the curing of the magnesia cement, which gives rise to desirable aesthetic effects.

The hydrated magnesium oxychloride has a structure approximately similar to that of calcium sulphate dihydrate and similar properties but is substantially harder than this. With the action of water on the magnesium cement, however, dissolution takes place preferentially at the edges and contact surfaces of the individual crystallites, so that initially solid elements may disintegrate into grainy aggregates.

Both the crystallization process and the dissolution of the MgO in the lye are exothermic processes, many imponderables influencing both dissolution and crystallization, so that there is an extensive patent literature which describes various proposals for stabilizing the hardening process.

As already mentioned, the low water resistance of the magnesia cement has also given rise to numerous patents and publications aimed at minimizing these adverse phenomena.

It is known that magnesia cement has excellent adhesion to all grease-free and wax-free substances, such as, for example, silicates or silicate minerals, as well as carbonates and carbonate minerals, glass, metal and often also organic substances, such as, for example, wood. However, all measures known to date have so far failed to produce magnesia cement panels which as such have good resistance and are suitable use for producing floors or the like. It is therefore the object of the invention to find suitable measures for increasing the stability of conventional magnesia cements and for achieving optimal space filling. It is intended to find combinations of components and a procedure which relate to a panel-like covering which can be satisfactorily produced and has excellent utility and aesthetic properties.

The inventor discovered that it is necessary to optimize the impermeability of conventional magnesia cements, i.e. to ensure that the free pore space or the pore space freely accessible to water is as small as possible. Since it is scarcely possible to achieve absolute freedom from pores, at the same time the residual pore spaces must be filled with substances which are very substantially water-repellent or which, through superficial swelling processes, do not permit further penetration of water.

According to the invention, the product formed should therefore be such that practically no water can penetrate into the interior under normal conditions in a living room, so that moisture can give rise to solutions only on the surface of the element according to the invention, along the magnesia cement crystallites, but not in the interior, and grainy disintegration is thus prevented.

The inventor recognized that this superficial dissolution is all the smaller the smaller the proportion of set magnesia cement on the surface of the panel. This can be effected, according to the invention, by increasing the proportion of inert additives at the panel surface.

Particularly since such magnesia cement concretes are often produced as wood cement or partial wood cement or magnesite composition owing to a very wide range of physical properties (weight, heat insulation, etc.) as well as for aesthetic reasons, it must accordingly be considered that the wood particles reaching the panel surface, which after all may have exposed capillaries due to grinding and polishing, are pre-prepared in such a way that water cannot penetrate into the interior along these substances.

According to the invention, an optimal end quality of a floor panel is obtained by the following measures which should preferably be combined with one another and each of which by itself already constitutes an inventive improvement. In order to achieve one intended aim, it is necessary to comply both with formulations according to the invention and possibly with a certain method of preparation of the formulation to give the material ready for setting. These ranges are.

a) A lye of 174 to 311, preferably 228 to 255 g $MgCl_2$ per liter of water must be used (density between 1.14 and 1.24, preferably between 1.18 and 1.20), i.e. less $MgCl_2$ than a concentrated solution would contain.
b) A proportion of (dry) $MgCl_2$ to MgO of 1:1.5 to 1:2.5, preferably about 1:2.0, i.e. more MgO than would correspond to a stochiometric ratio.
c) 30 to 70 percent by volume of fillers. Inorganic fillers, such as ground rock, sand, powdered minerals, etc., are very slightly absorptive or not absorptive and can therefore be used up to a degree of filling of 80% by volume. On the other hand, organic, absorptive additives, such as, for example, wood chips, can be added in a maximum amount of 30–40% by volume. However, organic additives are necessary to give the magnesite composition its specific character, are very desirable from the point of view of building physics and reduce in particular the undesired swelling or shrinking by a sort of "shock absorber effect". However, experiments have shown that a degree of filling of 40–75% by volume can be achieved even with organic additives which are not absorptive or very slightly absorptive, such as, for example, nutshells or olive kernel granules.
d) If the fillers are only inorganic and not absorbing water, there is no need of fine grain material. If, however, a certain amount of water absorbing inorganic or—especially—organic material, such as wood fibers, are added, a certain amount of up to 35% by volume of fine grain fillers like non-absorbing and non-reactive MgO or other rock powder should be added in order to improve fluidity and avoid draining off the liquid lye from the mixture.
e) The granulometry should preferably obey Fuller's curve: e.g. use 3 different grain sizes between 0 and 1.5 mm.
f) Even wood chips or other organic materials may have a chip length of 0.1 to 3 mm, preferably of 0.2 to 1.5 mm.
g) To achieve aesthetic effects, small amounts (up to 20%) of fibers or granules up to 10 or even 15 mm may be added as long as they can be processed properly in the mixture.
h) The relative humidity of the surrounding air during curing should not exceed 50% at 20 to 45° C.

The mixture may further comprise one or more of the following additives:

0 to 18 percent by weight of pigments;

about 2 to 40 percent by weight, preferably about 10 to 30 percent by weight of swelling materials, preferably acid-activated bentonite;

about 0.01 to 1 percent by weight of finely powdered casein, e.g. rennet casein and/or acid casein;

about 0.01 to 3 percent by weight of linseed oil stirred with about 30 percent of calcium hydroxide.

about 0.01 to 1 percent by weight opf polyphosphates;

The addition of ethyl silicate for further improvement of the water resistance is possible as a variant, although not essential.

It should be noted that, in the prior art, attempts are regularly made to provide mixtures which are as homogeneous as possible, and, for example, DE-C-3031086 indicates that efforts are made to hinder or at least greatly slow down sedimentation of the hardening fillers.

As described later, the inventor has recognized that this tends to be disadvantageous rather than advantageous in some special embodiments of panels according to the invention.

It is only the combination of the stated substances which is intended according to the invention that impressively improves the properties of the magnesia cement or of the panels produced therefrom. The aesthetic properties desired by the users are unsurpassed.

The preparation of the material is to be carried out, according to the invention, preferably by the following methods;

1. The binder is prepared from MgO and $MgCl_2$-lye. Preferably, precipiated MgO is used which is purer and finer and therefore has a better reactivity. This, however, leads to increased swelling. Te binder prepared from $MgCl_2$ and MgO shows large volume changes during its setting, depending on the composition. In the present mixing ratio, this takes the form of swelling. The pressures generated by the swelling endanger the wood frame construction and reach their maximum after 100–150 hours, after which they decline again (depending on the type and composition of the additives) to about 50–70%. It is therefore the object to keep the swelling peaks as small as possible.
2. The binder is then pressed through a screen in order to remove possible MgO agglomerates.
3. It is then mixed with the fillers and—optionally other above mentioned components—to give the magnesia cement concrete paste. The kind and grain size of the fillers should be such that the interstices between them are as few and as small as possible, his is achieved by ensuring that the main proportion (80% or preferably more than 90%) of the additives, regardless of whether they are of mineral or organic character, has a particle size greater than 200 $\mu$m. Particle sizes of less than 200 $\mu$m generally lead to very strong swelling and should therefore be used as additives only to as small an extent as possible.
4. The swelling behaviour of the magnesite composition during the setting process is very substantially reduced when a relatively dry room climate is maintained (<50% relative humidity at 20–45° C., preferably 30–35% relative humidity).

The setting of the magnesite composition is influenced on the one hand by the evaporation of the water and on the other hand also by reaction with the $CO_2$ in the air. Distortion of the tiles during setting is therefore prevented if the filled tiles are covered on their upper surface too until the time when they are released.

The structure of the set binder is predominantly crystalline and therefore also not very dense. On contact with water, in particular $MgCl_2$, but also MgO in very small amounts, are partially dissolved out of the set magnesite composition. This leads to spots. The experiments to treat the surface with oil and wax have shown that, owing to this porous structure of the magnesite composition, the applied preparations very rapidly sink to the depths, with the result that the necessary production of a surface barrier layer or closure of the pores is possible only with very great difficulty. One method for increasing the density of the magnesite composition is to add sodium waterglass or potassium waterglass. However, since the waterglass in the mixture immediately separates out by flocculation owing to the different pH values of waterglass and magnesite composition, waterglass and magnesite composition must be matched with one another with respect to their pH so that it is possible to mix them.

EXAMPLE 1

8944 g of a solution of 228 g of $MgCl_2$ per liter, having a density of 1.18 and 22° Be, are initially taken in a stirred vessel. 3695 g of precipitated MgO powder and 335 g of black pigment are sprinkled in and stirred with a turbine motor for 1.5 to 2 minutes at about 900 rpm. The mixture is then pumped through a steel sieve of 0.5 mm mesh size and metered into a second stirred vessel by means of a suction pump. Very small amounts of MgO agglomerates are retained, which agglomerates would not subsequently harden completely and, on surface-grinding a finished panel, would give white spots which would also break off. First 750 g of soft wood chips and 335 g of microcellulose, as soft-strength additives, and then 6370 g of ground rock containing less than 10% of fine particles smaller than 0.2 mm and 235 g of a particle size from 1.8 to 3.0 mm, as hard-strength additive, are sprinkled in to achieve a particular surface effect on the finished panel. The container is then closed with a cover and placed under 90% vacuum and mixing is carried out with a turbine mixer for 3 to 5 minutes at 900 rpm.

After opening and removal of the stirrer, a piston corresponding to the internal diameter is introduced from above into the container in the direction of the mixture until the latter rises in an outlet tube of 2 to 5 cm diameter, mounted in the middle of the piston and vents the tube. Its end has a pinch valve which closes at this instant by means of compressed air. The container is then rotated through 180° (turned upside down): the panel molds to be filled are moved underneath and are filled with the composition from the container by pushing the piston upwards and suitably opening and closing the pinch valve. The completely hardened panel has a Brinell hardness of 91 to 112 $N/mm^2$.

EXAMPLE 2

The procedure of Example 1 is repeated with the following amounts: 500 g of MgCl2 solution, 195 g of precipitated MgO powder, 2397 g of ground rock and no soft-strength additives. The completely hardened panel has a Brinell hardness of 150 to 200 $N/mm^2$.

EXAMPLE 3

The procedure of Example 1 is repeated, but with the following material: 500 g of $MgCl_2$ solution, 195 g of precipitated MgO powder and 75 g of 0.2 to 0.5 mm cork granules. The abrasion resistance of the completely hardened panel was measured by a test similar to DIN 53754 adapted to determine the penetration (in Am) into the tested surface after 100 or 200 resp. rotations of a grinding wheel under a predetermined load, in comparison with spruce, beech and oak, measured in each case on the crossgrained wood. While the woods exhibit an abrasion of 25 to 43 μm after 100 rotations and one of 48 to 93 μm after 200 rotations, three different samples of the panel thus obtained give an abrasion of 25 to 31 μm after 100 rotations and one of 38 to 56 μm after 200 rotations.

EXAMPLE 4

Wooden chips arc impregnated with about 0.2 percent by weight of hot linseed oil to which lime has been added. 10% of the lye required for the mixture are initially introduced and stirred with polyphosphate until dissolution. The pigments are then mixed-in, preferably by means of high-speed stirrers, whereafter the remainder of the lye is added. Then, the remaining components are added in the following sequence: casein - preferably digested beforehand in ammonia to give a transparent material; inorganic fillers; swelling material; organic fillers. The entire mixture is now thoroughly stirred and preferably evacuated and may then be introduced into moulds or poured onto process webs, or extruded in the case of hard consistency.

EXAMPLES 5 to 11

Various mixtures were processed similar to Example I but with differing compositions:

| specimen | /percent by volume/ | | | | Brinell hardness | abrasion (μm) per 100 rot.s | abrasion (μm) per 200 rot.s |
| | $MgCl_{2+}$ MgO + pigmen | hard-strong fillers | soft-strong fillers | effect fillers | | | |
| --- | --- | --- | --- | --- | --- | --- | --- |
| Ex. 5 (A) | 68.0 | 6.8 | | 25.2 | 50 | 95 | 113 |
| Ex. 6 (B) | 61.7 | 11.8 | | 26.5 | 15 | 66 | 85 |
| Ex. 7 (B80) | 71.5 | 8.8 | 19.7 | | 85 | 23 | 38 |
| Ex. 8 (F2) | 77.3 | 4.2 | | 18.5 | 80 | 28 | 47 |
| Ex. 9: Caro 0205N | 41.3 | 50.2(*) | 8.5 | | 137 | n.d. | n.d. |
| Ex. 10: HBK 15-75 | 42.6 | 36.1(*) | 21.3 | | 105 | n.d. | n.d. |
| Ex. 11: EF8-15N | 48.4 | 18.7(*) | 28.6(**) | 4.4 | 88 | n.d. | n.d. |
| spruce | | | | | 31 | 28 | 93 |
| beech | | | | | 71 | 43 | 53 |
| oak | | | | | 50–65 | 25 | 47 |

(*) 18 to 22 vol. % fine grain (<63 μm)
(**) cork pellets 0.2 to 0.5 mm

Among the fillers, "hard-strong" means quartz or marble sand, "soft-strong"means wood fibers, effect means longer (1.5 to 4 mm) wood fibers to achieve optical effects. The abrasion resistance was measured according to Example 3. The lower the ratio of $MgCl_2$ binder, achieved by dense packing of the fillers, the higher the resulting hardness.

In the case of all materials which are castable or just castable. vibration—for example at high frequency—can be carried out briefly, preferably to concentrate inorganic insoluble inert solids. As a result, a proportion of the heavier particles sinks downwards and thus produces a concentration of inert, insoluble solids on the lower side, which in the end is employed as the utility and/or ground side. These substances, which as a rule are also harder, permanently improve the end product owing to their properties.

The invention thus relates generally to a certain formulation and a certain method of preparing a paste of the formulation, in particular the application of reduced pressure and the use of, for example, high-frequency vibration after application of the material.

According to a further development, the material may also be applied with heating to cold or even preheated substrates. According to another special embodiment, the panels can also be positioned upright shortly after stiffening, as will be described in more detail below, so that distortion-free drying can take place on both sides. In the first stage, the drying should be effected primarily at a room humidity of about 95% to 100% relative humidity, which then preferably slowly decreases to about 60% relative humidity.

Furthermore, an initial ambient temperature of about 30° C. can be used during setting or drying and can be decreased to a final temperature of about 25° C., resulting in particularly good hardening. Of course, the disclosed magnesia cement mix and the process can also be used for manufacturing screed-like floor coverings without prefabrication. It is in fact itself readily mouldable and distributable in the same way as conventional magnesia cement floors. As a variant to the above mix, it is envisaged according to the invention to replace $MSCl_2$ with $MgSO_4$, reference being made in this context to the teaching of AT-B-345149, which is considered as being disclosed herein with regard to the quantification of the $MgSO_4$.

However, the invention furthermore relates to a panel or a sheet-like building element, such as, for example, a floor tile, a panelling element, a facade element or the like, which preferably, but not necessarily, is manufactured from the mix described above.

Known construction elements of this type have the disadvantage that they can be very easily damaged at their edges by virtue of the fact that they chip at these points. A further disadvantage of these known construction elements is the limited choice of materials suitable for manufacture, since many substances greatly change their shape, for example by distorting, in this production to give sheet-like construction elements.

It is therefore the further object of the invention to provide a construction element in which the edges cannot be easily damaged and a large number of materials can be used for manufacture, in particular those which are otherwise originally unsuitable for this purpose owing to insufficient edge strength. It is also intended to provide a construction element which, in prefabricated form, can be freed from surface scratches or surface holes in a simple manner by grinding.

According to the invention, this is achieved in the case of a sheet-like construction element of the type stated at the outset if it consists of a frame and a filling, and the frame and filling are connected nondetachably and in an interlocking manner, in particular are prefabricated, to give an integral part.

The filling is protected from damage at the edge by the frame and is held in shape so that it is also possible to use fillings which otherwise suffer distortions during hardening. Chipping or scratching of the surface can be eliminated by simple grinding of the construction element, it being possible for frame and filling to be simultaneously surface-ground.

In a further development of the invention, coloured pigments can be admixed with the filling.

Homogeneous colouring of the filling is thus achieved, so that the colour of the filling surface is retained in the event of scratching or chipping of the surface and when the construction elements are ground.

A further feature of the invention may be that the frame has regular geometric shapes, e.g. is square.

The construction elements can therefore be easily produced and can be used in a variety of ways.

Another variant of the invention may be that the frame—viewed in cross-section—has a groove-like indentation on the side facing the filling.

Such indentations increase the contact surface area between frame and filling, with the result that a high-strength connection is produced and the filling chips less readily at the edges.

In a further development of the invention, the indentation may be semicircular.

This makes it possible to achieve a particularly intimate connection between frame and filling, so that separation of the two as a result of loads during use is reliably avoided.

A further development of the invention may be that the indentation is triangular.

This measure, too, makes it possible to achieve an intimate connection between frame and filling.

Furthermore, retaining elements which project into the filling may be inserted in the frame on the side facing the filling.

In this way, a particularly advantageous increase in the contact surface area between filling and supporting frame is achieved. Loads imposed on the connection between frame and filling can thus be absorbed.

A further development of the invention may be that the retaining elements are formed from a corrugated metal strip arranged all around the side facing the filling.

An additional stiffening of the connection between frame and filling is thus achievable in a simple manner.

A possible feature of the invention is that the retaining elements are formed from pins which are made of metal or other suitable materials and are a distance apart and which are inserted into that side of the frame which faces the filling.

Retaining elements which have a stiffening effect for the connection between frame and filling can thus be mounted in a simple manner. The pins may be cylindrical or formed with a structured surface, for example by twisting, with the result that very good contact between filling and steel pin is produced.

According to a further feature of the invention, a lattice which extends over the entire frame inner surface, within the filling, can be used on that side of the frame which faces the filling.

A strong connection between frame and filling is achieved in this way, and the filling material itself is strengthened so that a higher load-bearing capacity is achievable. The lattice or the nets, fibres or the like are preferably laid in the tension zone, for example in the lower third of the total thickness of the panel.

According to yet another embodiment of the invention, the frame and filling may consist of different materials, with the result that it is possible to achieve compensated or desired expansion behaviour with respect to temperature changes.

The firm connection between filling and frame can be achieved by pouring the filling into the frame as well as by subsequently adhesively bonding the frame to the prefabricated filling or by bonding or casting a thin filling panel or filling material in frame on, a baseplate or in a milled-out plate. Suitable adhesives for wood and, for example, magnesite composition may be: magnesia cement, waterglass/casein adhesive, zinc cement, PU adhesive and the like.

According to a further development of the invention, the filling is formed from concrete, for example light-weight concrete.

A construction element according to the invention can thus be manufactured in an economical manner.

Furthermore, the filling may be formed from plastic.

The construction element is thus particularly easy to care for and, with an appropriate choice of material, is distinguished by very good resistance to weathering.

Another variant of the invention may be that the filling is formed from wood concrete.

This results in a light-weight construction element having particularly good heat insulation. This material which is very susceptible to damage at edges is very well protected by the frame and distortions are prevented.

A further development of the invention may be that the filling is formed from magnesite composition.

Consequently, the properties of this material, such as good heat insulation and high strength, can be very readily employed. Distortion of the construction element which otherwise occurs is prevented by the frame around this filling. Magnesite filling can furthermore readily be ground in order to free the construction element from surface scratches or holes. Chipping of the edges is also prevented.

In a further development of the invention, the frame or the filling may be formed from wood.

This results in particular in good biological building conditions for the construction elements according to the invention, which result from the heat-insulating and moisture-regulating properties of wood.

A further feature may be that the frame is formed from metal or stone.

By means of this measure, it is possible to manufacture very stable construction elements whose frame can also readily be manufactured as a single piece, especially in the case of metal.

Finally, a further variant of the invention may consist in the frame being formed from plastic.

Consequently, the frames according to the invention are very resistant to weathering and can be manufactured in a simple and economical manner.

The invention is illustrated in more detail beelow with reference to examples and with the aid of the drawings.

Figure 17:
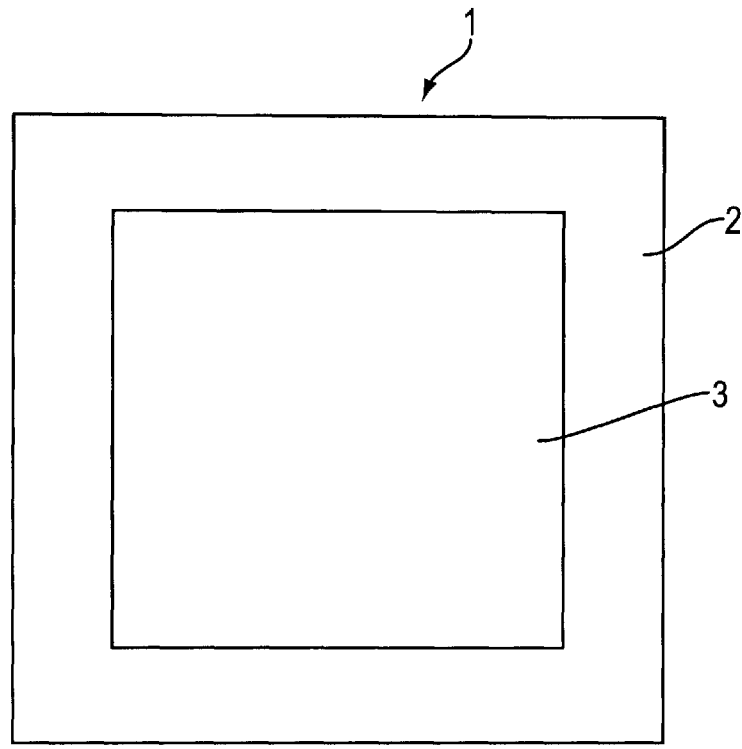
FIG. 17 shows a plan view of an embodiment of a construction element according to the invention.

FIG. 17 shows an example of a sheet-like construction element 1 according to the invention, which can be used, for example, as a floor tile, a panelling element, a furniture clement, a door element, a facade element or the like. A frame 2 surrounds a filling 3, the frame 2 and the filling 3 being nondetachably connected to give an integral part. Depending on the nature of the filling and of the frame, a construction element manufactured in this manner can be laid in a conventional manner on a very wide range of surfaces. The construction element shown here with a square shape can, for the purposes of the invention, be formed in various other shapes, as a rectangle, as a polygon, as a circle, as an oval or in any other sheet-like form.

However, the invention also relates to marquetry-type inlays of various materials in a filling material which is surrounded by a frame, resulting in good retention of the inlaid materials or shapes by interlock comparable to that at the inner edge of the frame surrounding the outside.

The materials for frame and filling are preferably chosen to be different but could also be similar, the frame function as a rule demanding a tougher, resistant material in order also to act as an edge protector.

The materials for the frame may be wood, metal, plastic, stone or any other material suitable for this purpose, Depending on the material used, the frame itself may be integral or, for example, in the case of wood, may consist of several assembled parts.

The filling may be either a prefabricated panel but may also consist of a number of castable substances which harden in the frame. Thus, for example, concrete, plaster, plastic, wood concrete or magnesite composition may be used as the filling.

Particularly advantageous for such an application are the substances wood concrete and, as described at the outset, panels of magnesite composition which, also owing to their wood-like heat insulation properties, meet very high biological building requirements when used as building material. These materials are also distinguished by very high strength and hardness, so that they may also be used under tough conditions. For magnesite composition and wood concrete, it is true in particular that these materials readily chip without protection of the edges and readily become distorted during manufacture in panel form so that, in the opinion of those skilled in the art, they are unsuitable for the manufacture of conventional tiles or facade elements. By means of the surrounding frame, distortion is prevented and the edges are protected. Moreover, the material of the frame can be chosen so that, in contrast to the filling, it is particularly readily machinable (e.g. tongue and groove for the lateral connection of adjacent elements to one another—comparable with conventional parquet floors), Wood is a material which is particularly suitable for this purpose.

According to a variant of the invention, a dye may be mixed with the filling so that the latter is coloured throughout and therefore does not lose its colour when ground. This is particularly advantageous if surface scratches or surface holes are to be eliminated, since the colour of the filling surface remains the same after grinding. The dyes used may be the substances conventionally employed for these purposes.

For the nondetachable connection of filling and frame, it is possible to provide means which help to produce as intimate a connection as possible between these. One possibility according to the invention is to provide an indentation in the frame cross-section on the side facing the filling, so the filling has a greater contact surface area with the frame and thus interlocks with the latter.

Figure 18:
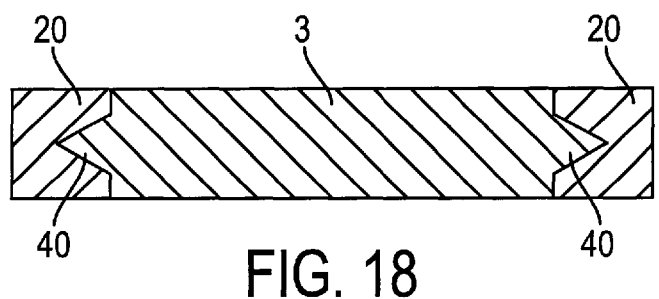
FIG. 18 shows a cross-section through a further embodiment according to the invention.

FIG. 18 shows a cross-section of a further embodiment of a construction element according to the invention, the cross-section of a frame 20 having a triangular indentation 40 which is preferably made in all frame parts, optionally in a continuous manner. The filling 3 completely fills this indentation 40.

Figure 19:
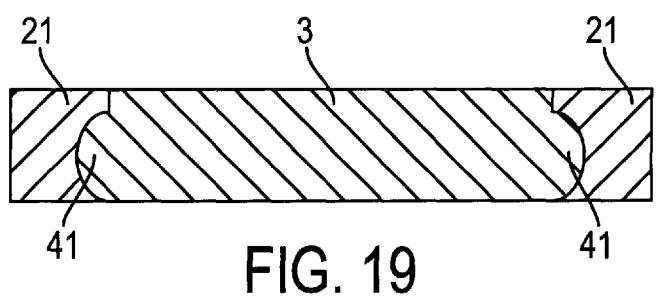
FIG. 19 shows a cross-section through a further embodiment according to the invention.

In a further development, a semicircular indentation 41 can be provided on that side of a frame 21 which faces the filling 3, so that the filling penetrates into this indentation and can intensify the interlocking contact of the frame 21 (FIG. 19).

Figure 20:
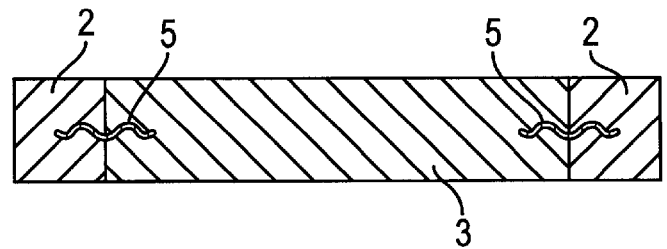
FIG. 20 shows a cross-section through a further embodiment according to the invention.

In FIG. 20, a retaining element in the form of a corrugated metal strip 5 is provided in a rectangular frame 2, said metal strip projecting from that side of the frame 2 which faces the filling 3 into the filling 3 and reinforcing there the connection of frame 2 and filling 3. The metal strips can, however, also be otherwise structured or smooth; they are, if appropriate, also replaceable by materials other than sheet metal, such as, for example, plastic or nonwovens or the like.

Figure 21:
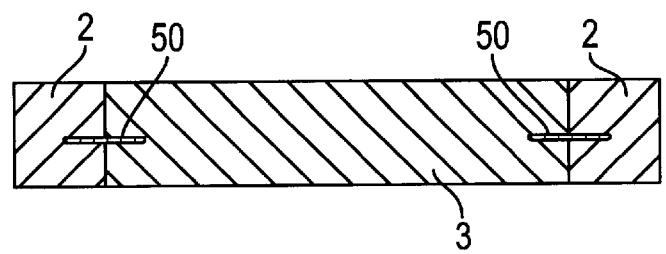
FIG. 21 shows a cross-section through a further embodiment according to the invention and FIG. 22 shows a plan view of a further embodiment according to the invention.

Furthermore, FIG. 21 shows metal pins 50 which are inserted into the frame 2 all around and a distance apart and project into the filling 3 and likewise serve for intimate connection of filling 3 and frame 2. The metal pins 50 may be cylindrical or may be formed with a structured surface, for example by twisting, with the result that very good contact between filling and steel pin is produced. Instead of metal pins, other pins having a certain strength may be used.

Figure 22:
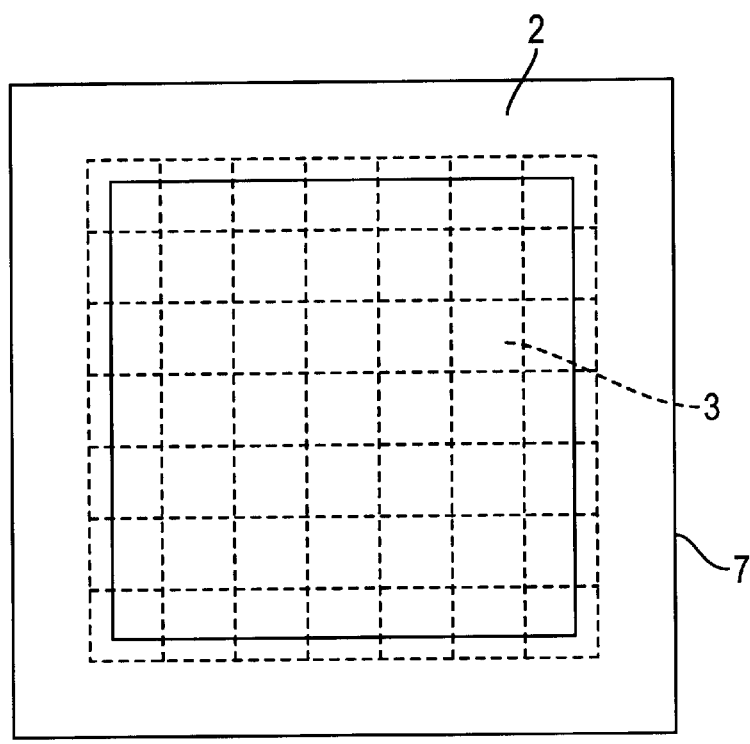

FIG. 22 shows a further possibility for supporting and connecting frame and filling. A lattice 7 is used on that side of the frame 2 which faces the filling 3, which lattice extends over the entire frame inner surface and within the filling 3. Greater stability of the filling 3 itself is therefore additionally achieved, as if a concrete or magnesite composition filling were strengthened in this manner by a steel or glass fibre lattice or a plastics lattice. A variant is obtained if the frame has a sandwich-like structure and the lattice or the like is clamped or fastened between the frame parts.

A further development of this invention leads to a novel practical method of laying, where lattice or similar structures project outwards beyond the sandwich-like frame construction so that sandwich structures lying side by side and a distance apart are bonded to one another and optionally also to the substrate by filling the intermediate spaces and enclosing the projecting lattice parts. Suitable filling or adhesive materials are known to a person skilled in the art. The magnesite composition according to the invention is preferably used.

However, the invention furthermore relates to a novel process which in principle is successfully used for the manufacture of sheet-like construction elements from liquid or pasty, setting materials, in particular hydraulically settable materials, such as, for example, magnesite binders, in particular magnesite composition with magnesia cement, white cement, concrete or the like, which is therefore not reliant on the mixture described at the outset and on the panels but may also relate to other substances or panels. Floor coverings of magnesia cement are known. They are applied to the building site directly in the same way as screeds and harden there. Only inadequate proposals have been made to date with regard to prefabrication of such floor coverings. The inventive concept described above and relating to the frame-reinforced panels forms a better basis.

Panels which are novel according to the invention consist of a frame which, as mentioned, is connected firmly and in an interlocking manner to a filling material of magnesia cement or magnesite-bound composition. The manufacture and transportation of such elements, especially when the filling has not yet completely dried, gives rise to a problem, especially since, for example, magnesite composition is applied as a pasty, moist material and must harden before it is transportable or further processible. This gives rise to certain problems since the water may emerge from the material and flow into gaps—for example between the wooden frame and a support surface on which the frame rests. The disadvantages are that dyes may be washed out on the one hand and the wood of the frame may suffer damage, for example discoloration, on the other hand. Moreover, the water flowing away in this manner and any substances of the mixture which are dissolved therein are lacking, and this may result in poor hardening, inhomogeneities or other defects in the filling.

In addition, prefabricated panels must be equally hardened and flat on both sides. This could not be achieved by conventional methods with which, for example, known floor coverings were produced, since the water evaporates more rapidly from the pasty mixture at the surface than at the lower surface on the support surface, which is essentially sealed off from air.

It is the object of the invention to provide a process by means of which panels of the materials mentioned can be manufactured as economically as possible. In particular, it is intended to find a possibility for manufacturing homogeneous, sheet-like construction elements, in which optimal and distortion-free hardening of the filling is achieved.

In a further development of the process, it should preferably also be possible to apply reliefs in a simple manner to the construction elements.

Furthermore, it is intended, in an independent inventive step, to find a solution for the transportation of semifinished panels from one work location to the next within the manufacturing company.

This object is achieved by the following process steps: in the manufacture of the sheet-like construction elements, the filling material is poured into horizontal frames. The optimal curing is achieved when material distortions, caused by chemical hardening reactions taking place at different rates and unequal hardening rates of the lower and upper side of the panel, are prevented. This is achieved by moving the frame with its filling at the earliest possible time from its horizontal support surface into an at least approximately perpendicular position. According to the invention, the optimal time occurs after the first (chemical) setting process, in which the panel-like material has achieved sufficient intrinsic stability for the first time to avoid becoming deformed when placed in the perpendicular position. According to the invention, bonding (adhesion) of the filling to the support surface is avoided by means of a release sheet, in particular a thin release mat of resilient material, between the frame or the filling and its support surface. The elasticity of the release mat also leads to sealing of the inner edge and of the support surface of the frame from the pasty filling or from the liquid contained in the pasty filling, since the frame penetrates slightly into the mat as a result of a suitable clamping pressure. This avoids the abovementioned disadvantages through liquid loss beyond the frame edge.

After placing in the perpendicular position, this release mat is removed so that air uniformly reaches both sides of the filling and can thus dry it uniformly. After the second hardening process (drying) in the perpendicular position, the panels are ground and then impregnated with varnish, lacquer, oil, plastics resin or the like, preferably in a dip bath or a high-pressure impregnation unit, possibly by a VPI process (vacuum pressure impregnation).

A preferred apparatus for carrying out the process, namely for holding down the frame during the filling operation, is a vacuum suction plate apparatus which sucks the frame and thus presses it against the support surface so that the sealing effect between release mat and inner frame edge—as described above—occurs. This suction apparatus consists of a rigid, load-bearing material, for example metal or glass fibre-reinforced plastic or carbon-reinforced materials, evacuatable hollow elements or a plate and has uniformly distributed suction holes in its upper side. The upper side could alternatively also be coated with a resilient layer, for example of rubber, the rigid upper side of the suction apparatus, including the coating, being perforated.

During operation, before the frame is placed on the perforated plate of the first variant, a rubber mat is positioned which on the one hand performs the function of the release mat and on the other hand is cut out only in regions of the frames to be placed on top in such a way that, when an appropriate frame (frame frieze) is placed on top, the latter rests with its lower surface at all edges on the rubber mat, is sucked through remaining cavities in the rubber mat by means of suction air from the perforation and is pressed against the rubber mat. It is advantageous, but not absolutely necessary, for the cut-out parts to agree geometrically exactly with the projection of the frame; all that is necessary is for the cut-out parts not to project beyond the frame edges. For example, it is also possible for only relatively large holes to be punched in the rubber mat in the region of the frame. Instead of rubber, however, it is also possible to choose any other resilient materials. Soft plastics or plastics films can also be chosen as disposable films whereas, for cost reasons, the rubber mats should be reused.

In the case of the second variant having a rubber coating, a second flexible film is provided and is either cut out as described above or cut out in somewhat larger areas so that the frames can be completely inserted into the cut-outs. Rubber on rubber gives a very good seal. In this variant, it is also sufficient to place the frames on the rubber coating and then to place a thin film corresponding to the internal dimensions of the frames, as a release mat or release film, into these frames from above.

To increase the tightness between the release mat and the frame, the latter may also be coated or impregnated beforehand with lacquer or the like, for example shellac, according to a further concept according to the invention, and may therefore have a smooth surface which can be readily sucked by means of a vacuum. The impregnation further prevents the penetration of water, and any coloured pigments dissolved in the water, from the filling into the wood of the frame.

The rubber mat or release mat placed on top may be slightly recessed in the region of the frame or preferably so resilient that the frame presses into it and the filling thus moves slightly back relative to the frame. If the filling is thus slightly depressed relative to the frame, the formation of occlusions or material overflows between release mat and frame is optimally avoided. Furthermore, a reference surface required for exact grinding is formed. Thus, satisfactory transitions between filling and frame are formed in the subsequent grinding. Liquid loss along the frame is thus also avoided.

The release mat may have reliefs or the like in the region of the filling, in order to achieve a relief-like surface of the panel. Of course, relief is also to be understood as meaning projections, grooves and perforations.

With the vacuum suction plate apparatus described, the positioned frame or the already cast panel can be transported from one work location to the next without problems. It is advantageous if the evacuatable cavity can be sealed off from the outside by means of a shutoff valve so that it remains in the evacuated state even when it is away from the vacuum connection for transportation purposes.

During panel manufacture, it is advantageous to detach the release mat at a time when the filling still has not firmly set, i.e. is still moist or wet. This time is reached after the first chemical setting.

Silicone or natural rubber films having a thickness of about 0.7–1 mm are suitable. In principle, the manufacture of magnesia cement panels using films is already known, but the films serve there for producing a laminated panel in that the films remain on the cement. This is described in DE-B-2522515.

However, the invention is not restricted to panel manufacture with rigid frames remaining on the panels. It is also possible to provide interchangeable frames which are used for the manufacture of homogeneous panels.

Figure 23:
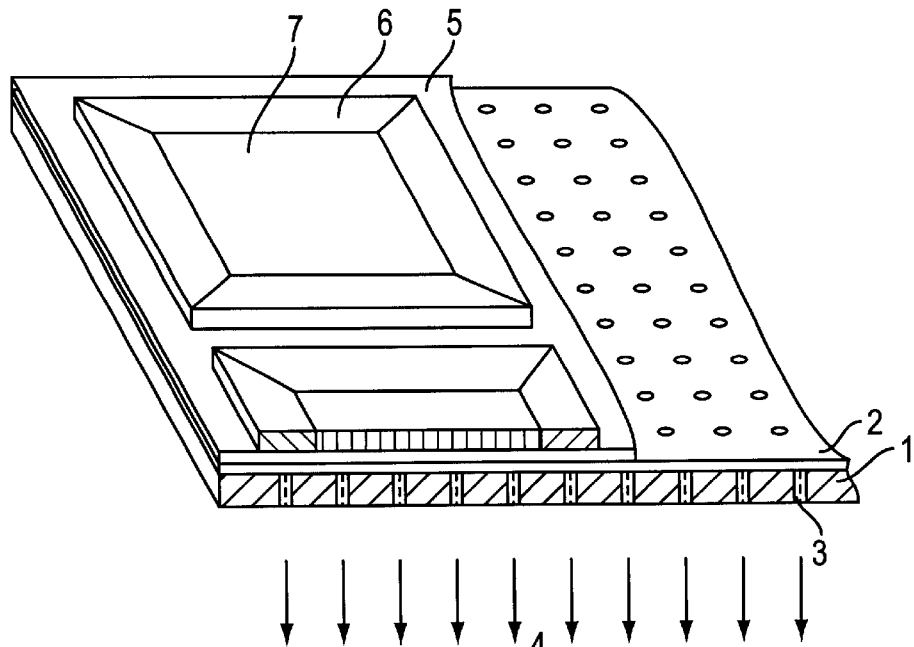
Figure 24A:
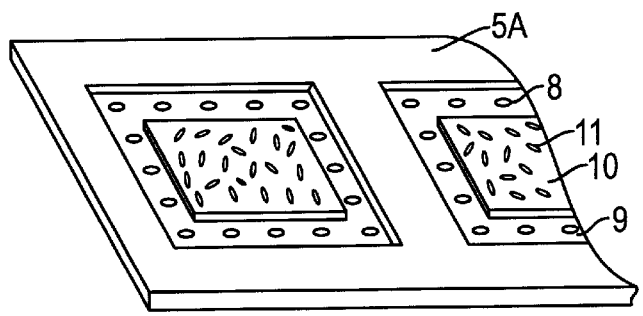
Figure 24B:
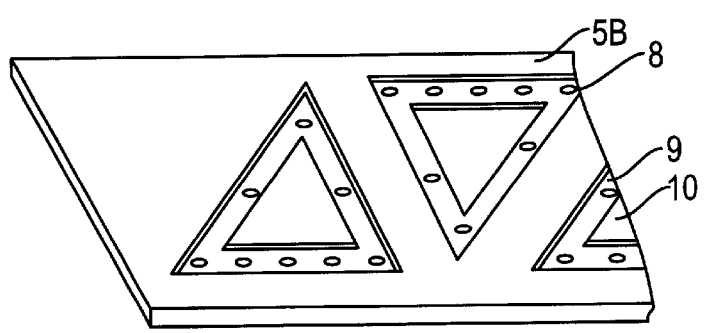
Figure 25A:
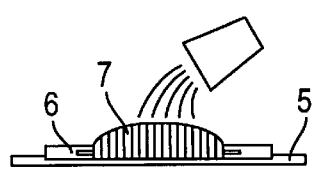
Figure 25B:
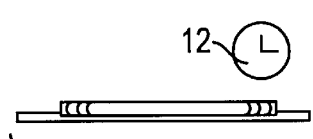
Figure 25C:
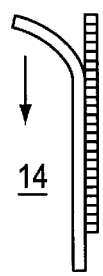
Figure 25E:
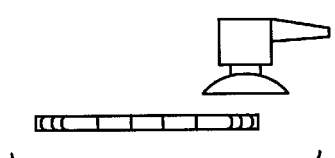
Figure 25F:
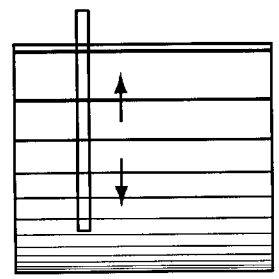
Figure 25D:
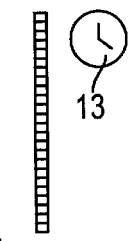
Figure 26A:
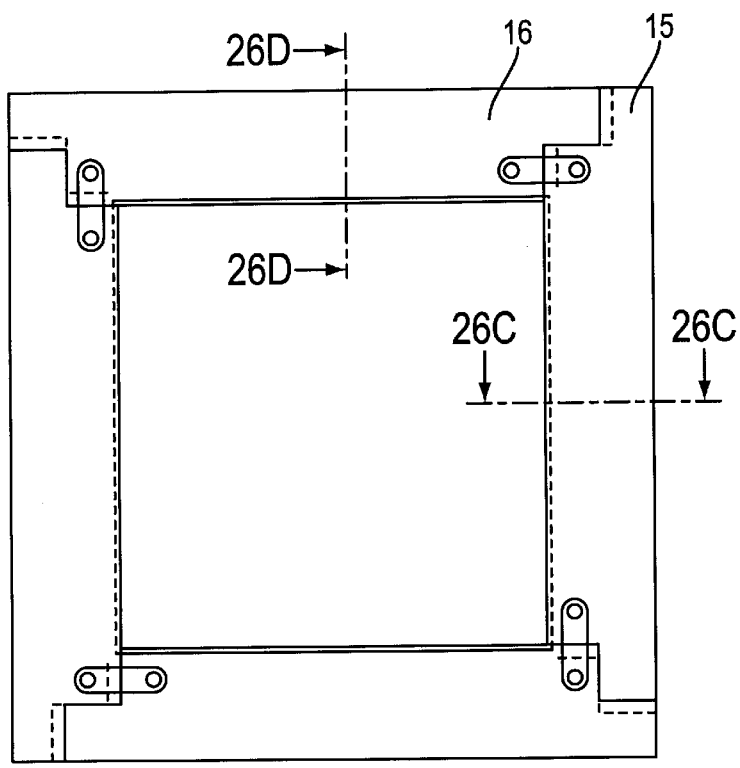
Figure 26B:
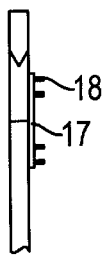
Figure 26C:
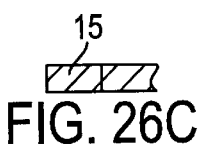
Figure 26D:
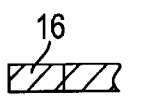
Figure 27:
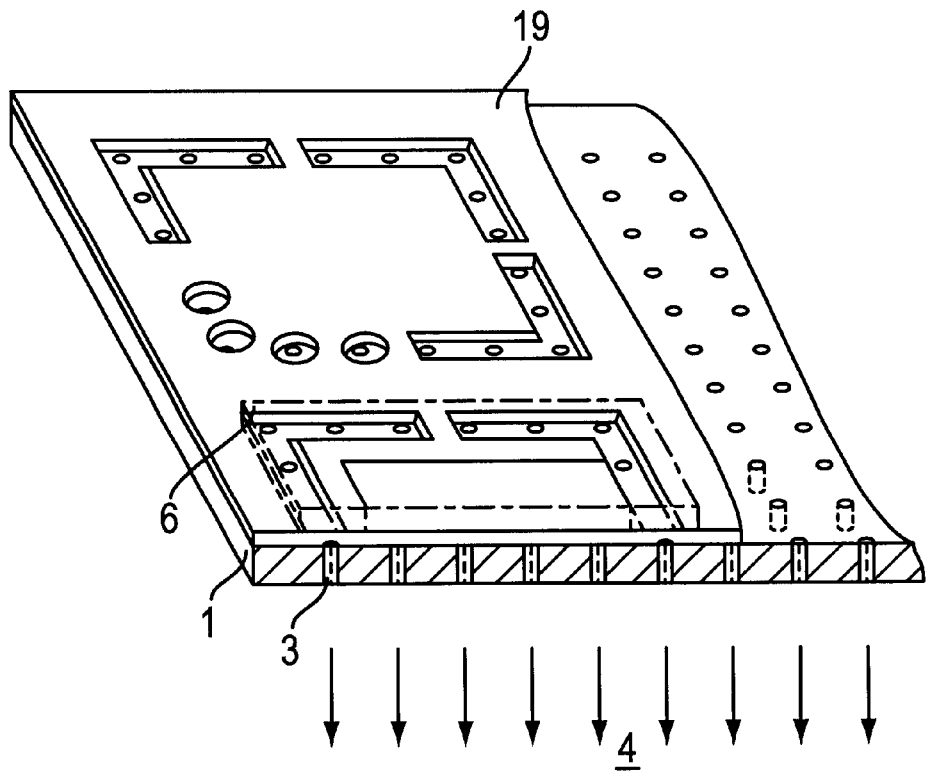
Figure 28:
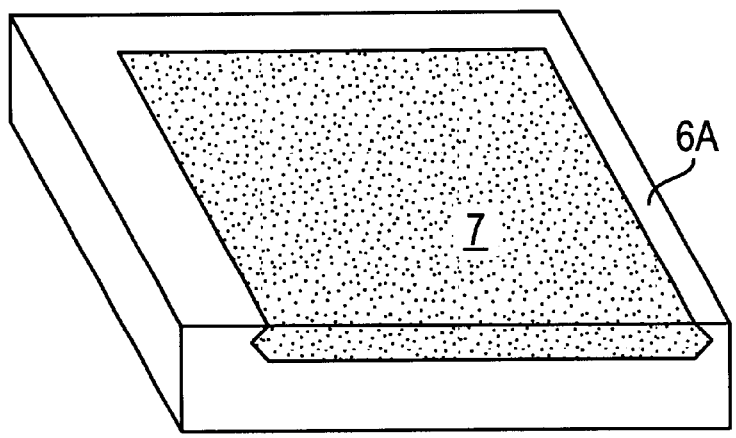

FIG. 23 shows a part of the retaining apparatus for frames a vacuum suction plate apparatus with cast panel placed on top;

FIG. 24 *a* and *b* show two variants of rubber mats for placing on the vacuum suction plate apparatus according to FIG. 23;

FIGS. 25*a*–25*f* show the operations of introducing the still pasty filling up to impregnation in schematic form;

FIG. 26*a* shows an example of an interchangeable frame and FIGS. 26 *b* and *c* show details thereof;

FIG. 27 shows a preferred variant of a suction plate apparatus having sieve-like holes, which can also be arranged in substantially smaller dimensions and greater frequency, for clamping frames with only one resilient release mat, and schematically represented, different, extensive and hole-like recesses;

FIG. 28 shows a different structure of an independent invention, comprising a continuous wooden frame 6a (possibly of sandwich design) with inserted filling 7 of magnesite composition or the like for an architecturally readily usable furniture or building board having good sound insulation and fire-retardant properties, which can also be manufactured without the process described above since it need be ground only on one side.

FIG. 23 shows the upper part of the vacuum suction plate apparatus with a hollow element or hollow plate with a frame which has already been placed on top and into which material has been poured. The plate 1, on the lower surface of which an air-tight space (not shown) with a vacuum connection and shut-off valve is formed, is coated with a resilient layer 2, for example a rubber sheet. The coated plate 1, 2 contains holes 3 distributed over the entire area. A vacuum 4 is now generated underneath the plate or in the interior of the hollow element. An article, for example a glass sheet, a rubber mat or the release mat or the frame 6 is thus sucked down. By moving the entire retaining apparatus, an element can be transported without problems.

For casting the panel elements, only the frame 6 may be sucked down. For this purpose, a further rubber sheet 5 (FIG. 24) is placed on the resilient layer 2 which contains holes 8 only in the region of the frame 6 or is cut out there similarly to the frame. From the interior of the retaining apparatus, the rubber sheet or mat 5, which also serves as a release mat, and furthermore the frame 6, which rests on top, are sucked down to provide a seal. The filling material 7 can now be poured in.

FIG. 24 shows two of diverse variants (5a, b) of the rubber mat 5 on which the frame 6 is placed. The range of variants is immense since the rubber sheets 5 can be produced with or without reliefs 11 in the filling region 10. A very wide range of patterns are possible for the reliefs. Furthermore, the shape of the frame 6 can be varied as desired, and hence also the shape of the recess 9 for insertion of the frame. In order to suck down the frame 6, the vulcanized or adhesively bonded rubber sheet has, in its support area 9, holes 8 which correspond to holes 3 in the retaining apparatus.

An improved embodiment is shown in FIG. 27, in which the rubber coating of the metal plate is dispensed with and a single rubber mat is sufficient by virtue of the fact that this is recessed in the region of the frame so that the frame parts rest tightly against the rubber mat and the regions immediately below the frame are connected by suction air to the perforations of the metal plate so that they can be sucked down.

FIGS. 25a–25f show the necessary operations, in sequence, to give the finished extensive construction element.

I. Pouring the still pasty material 7, for example comprising magnesite composition or the like, into the frame 6 fixed to the retaining apparatus.

II. Spreading and/or vibration of the material 7 is followed by the first (chemical) hardening process (symbolic time representation 12) in the horizontal position. ;

Ill. The construction element is placed upright, for example brought into a perpendicular position, from the horizontal after the first hardening process, and the release sheet 5 is removed (14).

IV. Second hardening process in the perpendicular position (symbolic time representation 13).

V. The completely hardened construction element is ground at least on one side, but optionally also on both sides (without damage to any relief).

VI. Impregnation of the construction element with varnish, varnish oil, synthetic resin or the like, preferably in a dip bath or a high-pressure impregnating unit, possibly by a VPI process.

Operations V, and VI, can optionally also be interchanged.

FIGS. 26a–d show an example of an interchangeable wooden frame for the production of homogeneous panels, i.e. the interchangeable frame is removed after the first hardening of the filling. The interchangeable frame consists of two almost identical strips 15, 16 which differ only in that the groove for the shape of the filling points inwards 15 on the one hand and outwards 16 on the other hand in order to ensure that the individual panels can be mounted. There are no restrictions to the arrangement of the four strips 15, 16. The strips 15, 16 are fixed at the corners by means of a small metal sheet 17 and two screws 18, a clip or the like, in order to impart temporary stability to the frame. The frame part may also be grooved over a mitre joint. The invention also relates to metal or plastics frames which are clamped together, for example, also by means of a metal or plastics band with a fast-action closure along its outer periphery. The frame 15, 16 extends beyond the filling in the plane of the construction element about two to four times the thickness of the frame and at least the thickness of the frame.

Other frame shapes and other possibilities for fixing said frames are also possible, for example elastically coated interchangeable frames, so that the sealing effect is provided by the frame itself.

FIG. 27 shows a preferred variant of FIG. 23, which manages with only one resilient release mat. The upper, perforated part of the vacuum suction plate apparatus is covered with a rubber sheet 19, which optionally simultaneously serves as a release mat, and a frame 6 indicated by a dash-dot line. The hollow plate 1, on the underneath of which an air-tight space (not shown) with a vacuum connection and shut-off valve is formed so that the space or the plate with enclosed vacuum can be transported over distances regardless of a vacuum source, contains sieve-like holes 3 which are distributed uniformly over the entire area and are shown only symbolically. A vacuum 4 is now generated underneath the plate. An article, for example a glass sheet or the frame 6, can thus be sucked down.

Only the frame 6 may be sucked down for casting the panel elements. For this purpose, a rubber sheet 19 is placed on the metal place 1, which may also be composed of another dimensionally stable material. This rubber sheet has a continuous recess (shown at the top and bottom) or a hole system, both of which are slightly narrower than the frame 6, which however exposes the perforations underneath. This provides a support surface for the frame 6 all around in the parts not recessed. The rubber sheet 19 and also the frame 6 which rests on top are sucked down from the interior of the retaining apparatus to give a seal, The filling material 7 can be poured in. An additional release mat may be inserted between rubber mat 19 and filling material 7, this being preferred if many frames are present thereon simultaneously. The release mat is then preferably only a thin, cheap plastics film.

The mat 19 shown could also have reliefs in the region of the filling. In the case of a building board according to FIG. 6, reliefs can be applied by punch impression or the like in the upper surface of the filling 7 while the latter is still in the pasty state.

List of reference symbols for FIGS. 23 to 28
1 Plate, e.g. metal plate
2 Resilient layer, e.g. rubber
3 Hole
4 Generate vacuum
5 Rubber mat or sheet, release mat
6 Frame
7 Filling
8 Hole
9 Support surface of the frame
10 Area for filling (filling region)
11 Reliefs
12 First hardening process
13 Second hardening process
14 Removal of rubber mat (5)
15 Strip
16 Strip
17 Metal sheet
18 Screws
19 One-piece rubber sheet for covering the holes 8 and simultaneously forming a sealing function with respect to the frame 6.

Furthermore, a series production process known per se, as described in U.S. Pat. No. 4,312,674, is an alternative to the processes described so far for the manufacture of panels comprising magnesite compositions. In order to avoid unnecessary duplications of information, the disclosure of the U.S. Patent is hereby incorporated by reference in its entirety for the purposes of this application. This applies in particular to the Figure and associated description of the Figure, where according to the invention, as a modification of this En process, a vibration means may also engage at position 38 in order—as already mentioned —to achieve a certain sedimentation of the filler material so that particularly hard and dense fillers which improve the surface can be somewhat separated from others, such as, for example, wood or the like. For floor panels, the hard side is then preferably that which is ground and which faces the room. Precisely the opposite may be desired for wall and ceiling claddings, in order to utilize the properties of light, porous fillers, such as, for example, wood, in particular the sound insulation properties.

A preferred further development of the process or a preferred apparatus and a specially designed panel is described below with reference to FIGS. 29a–c to 33. The process corresponds to an injection molding process. Since the mixture is filled under pressure into the frame space sealed at the top and bottom, it is desirable if the air in the space to be filled is removed at the correct points. According to a variant this is achieved by a three-layer structure of the frame 6*b*. The middle layer of the frame 6*b* is produced from about 2 mm thick solid wood or plastic laths 60 which are laid in the form of strips a distance apart so that, in the finished frame 6*b,* horizontal aeration channels 61 remain free between the interior and the exterior of the frame, in particular beginning in the grooves 62 where the latter are present. Of course, such vent channels can also be produced by drilled holes or by cuts in inserted intermediate pieces. FIGS. 30*a* and 30*b* show variants of an interlocking connection between inner part and frame, where, conversely, the grooves 62*a* and 62*b* shown may also be formed in the filling 7. This interlocking embodiment makes it impossible for individual frame parts to be separated from the filling after separation (cutting apart) of the panels with frame from case to case—as may be necessary in the course of laying work. The filling and the frame thus also form a unit when cut to size. FIGS. 31 to 33 refer to the special production process by means of injection molding: the frames 6, 6*e* are filled by means of injection molding, the prepared mixture 7 being forced, via a filling connection 65 pressed for the duration of the filling process against an opening 63 in a cover plate 64, into the cavity to be filled which is formed by the sandwich comprising press support 5*a,* frame 6*e* and cover plate 64. After the end of the filling process, the cover plate 64 and the press support 5*a* remain on the frame 6*e* for the duration of the first setting process. Distortions during setting can thus be avoided. According to a further development, the press support 5*a* is provided with a continuous groove 66 and vent channels 67. On the one hand, the groove 66 prevents troublesome air occlusions at the butt joint between filling and frame or at the inner frame edge and, on the other hand, in combination with the fine vent channels 67 running from the inside to the outside, it can remove at optimal points the air displaced during the filling process. In a particular variant, by means of which the outlet 68 of the vent channels is led through the press plate to the lower side of the latter, as indicated on the left in FIG. 31, this arrangement can be used for applying a vacuum. The advantages of this variant are: acceleration of the filling process, reduction of the filling pressure and hence protection of the mixture of filling material; avoidance of air occlusions.

However, the invention furthermore relates to a preferred retaining element, in particular for two adjacent panels or extensive construction elements, corresponding to the above data, and a floor system of panels according to the invention, having a retaining element according to the invention.

Retaining elements of this type are required when laying extensive construction elements, for fixing the latter.

The object of this additional aspect of the invention is therefore to provide a retaining element of the type stated at the outset, which ensures that the construction elements are a defined distance apart. Furthermore, it is the object of this aspect of the invention to provide the possibility of holding down the extensive construction elements in an invisible manner by means of the adhesive joint, for example also of fastening at least some construction elements which are not adhesively bonded to the substrate or otherwise held down. In particular, it is the object to provide a retaining element for the level laying—under either wet or dry conditions—of extensive areas, and the retaining element should remain very largely concealed from an observer of the visible surface of the extensive construction elements. Furthermore, the retaining element should also be capable of achieving the object of supporting or firmly holding construction elements so that they have play in their expansion movements and do not damage adjacent construction elements. Sinking of the construction elements during wet laying of the construction elements into the adhesive or mortar bed should likewise be capable of being prevented by such retaining elements. Advantageous potential applications for a novel floor concept emerge in particular for the novel panels made of magnesite composition and with or without a frame. However, even regardless of this, the invention can usefully be applied to other panel-like construction elements.

The object is achieved if the retaining element—viewed in cross-section—has a middle part, from the two ends of which limbs project essentially perpendicularly in various directions.

By means of the proposed measures, it is possible to achieve very reliable spacing of the extensive construction elements. The retaining elements may extend over the entire length of the edges of the extensive construction elements or may be used only in sections. The retaining elements may also be in the form of continuous rails or in the form of individual pieces whose length is considerably smaller than the length of a lateral edge of a sheet-like construction element. As a result of the particular shape of the retaining elements according to the invention, sinking (loss of levelness) of the construction elements during laying of the construction elements is prevented. Furthermore, by means of the retaining elements, a construction element can be decoupled from an adjacent construction element with regard to its expansion movements, with the result that any stresses are not transmitted to the adjacent element.

This invention furthermore relates to an arrangement of extensive construction elements, such as, for example, a floor covering, wall panelling, a facade, or the like, having retaining elements according to the invention, the construction elements each consisting of the same or different materials.

In such arrangements, extensive construction elements are generally laid in a plane, a gap being left in each case between adjacent construction elements in order to avoid stresses which are caused by heat- and moisture-induced expansion and which may otherwise lead to destruction of the arrangement. Another often unavoidable situation is one where not only must construction elements of different materials be decoupled from one another but also construction elements have to be arranged a distance away from the substrate in places, in order to prevent the action of expansion forces on the construction elements. Measures known to date are not optimal or are expensive, The object of the invention is therefore to propose an arrangement of the type described above which can be easily laid, where there is no danger of damage to the construction elements even when the latter have large coefficients of expansion and where the mutual spacing of the construction elements is not changed during the laying work. In particular, however, it is intended to achieve in a simple manner levelness in combination with invisibility of the retaining elements essentially from the level visible surface.

According to the invention, this is achieved if the middle part between the end surfaces of the construction elements and one limb of all retaining elements is arranged a smaller distance away from a common outer surface of the construction elements, for example the visible surface of the arrangement, than the other limb of all retaining elements.

By means of these measures, one construction element can be held against the other in succession, with the result that sinking of individual construction parts can be avoided. Furthermore, the gaps between the construction elements can be fixed in a simple manner and can be secured against displacement without retaining elements becoming visible on the visible surface. It is also possible to arrange construction elements a distance away from the substrate.

In a further development of this invention, it is possible to ensure that at least the limb which is located closer to the common top surface is inserted into the end surface of the construction elements, preferably into a recess, such as, for example, a blind hole, a groove or the like.

Particularly simple and rapid connection of the retaining elements to the extensive construction elements is thus possible.

A further feature of the invention is that the limb which is further away from the common top surface is held against a substrate for the arrangement.

In this way, the retaining element is fixed to the substrate by means of one limb so that the other limb of the retaining element can perform the decoupling function for an adjacent construction element.

Finally, in a further embodiment of the invention, the end surfaces of the construction elements are recessed in the support region of the limbs.

Consequently, an expansion joint can be created in a particularly simple manner. Furthermore, there is improved guidance of the retaining element and greater stability with respect to sinking of the construction elements. Moreover, in the case of a retaining element of this type, a part of its cross-section is concealed by the construction element so that even small gaps can be realized between construction elements.

It is also possible to ensure that the limb which is further away from the common top surface has passages.

As a result, mortar can penetrate into these passages during laying so that one limb of the retaining element is intimately connected to the mortar bed.

In a further development of the invention, it is possible to ensure that an end surface of the extensive construction elements is provided with a recess into which the limb of a retaining element is inserted, and that the limb of a further retaining element, which is arranged at the end surface of the adjacent construction element, can be pushed into this recess so that the retaining elements are arranged one on top of the other.

As a result, when using different construction elements, different gap widths can be achieved between the construction elements with otherwise identical retaining elements.

A further retaining element of the type stated at the outset which achieves the object of the invention can be realized if the retaining element—viewed in cross-section—has a middle part, from one end of which a first and a second limb project essentially perpendicularly in different directions and from the other end of which a further limb projects essentially parallel to one of the other two limbs, In this way, the stability of the connection between two bordering construction panels is increased. In particular, maintaining the same level of the two components is thus ensured to a greater extent.

A further arrangement, according to the invention, of extensive components with such a retaining element can be achieved if the middle part is arranged between the end surfaces of the construction elements and the first and the second limb of all retaining elements are arranged a smaller distance away from a common outer surface of the construction elements, for example the visible surface of the arrangement than the further limb of all retaining elements.

As a result, sinking of the extensive construction elements in the mortar or adhesive bed during laying can be prevented and hence an identical level of the individual construction elements can be achieved. Furthermore, the uniform spacing for a gap between the construction elements can be created. The retaining elements are no longer detectable after joining.

In this context, it is possible to ensure that at least those first and second limbs which are closer to the common top surface are inserted into the end surfaces of the adjacent construction elements, preferably into a recess, for example, a blind hole, a groove, or the like.

This makes it possible to achieve a very rapid laying technique, the retaining elements with the respective first limb always having to be inserted only into the recesses of one construction element in order then to insert the subsequent construction element into the respective second limb.

In a further possible variant of the invention, the limb which is further away from the common top surface is held against a substrate for the arrangement.

Secure retention of the construction element can thus be implemented.

It is also possible to ensure that the end surfaces of the construction elements are recessed in the support region of the limbs. Consequently, it is also possible to produce an expansion joint in a simple manner.

In this way, the limb does not project beyond the construction element and there is no need for any other height compensation.

Finally, in a preferred embodiment of the invention, the limb which is further away from the common top surface has passages.

As a result, improved retention of the retaining part in the mortar or adhesive bed can be achieved.

The invention is now illustrated inmore detail with reference to the Examples shown in the drawings.

Figure 1:
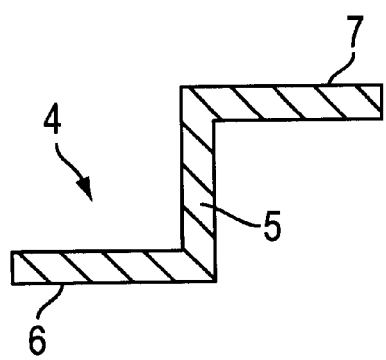
Figure 2:
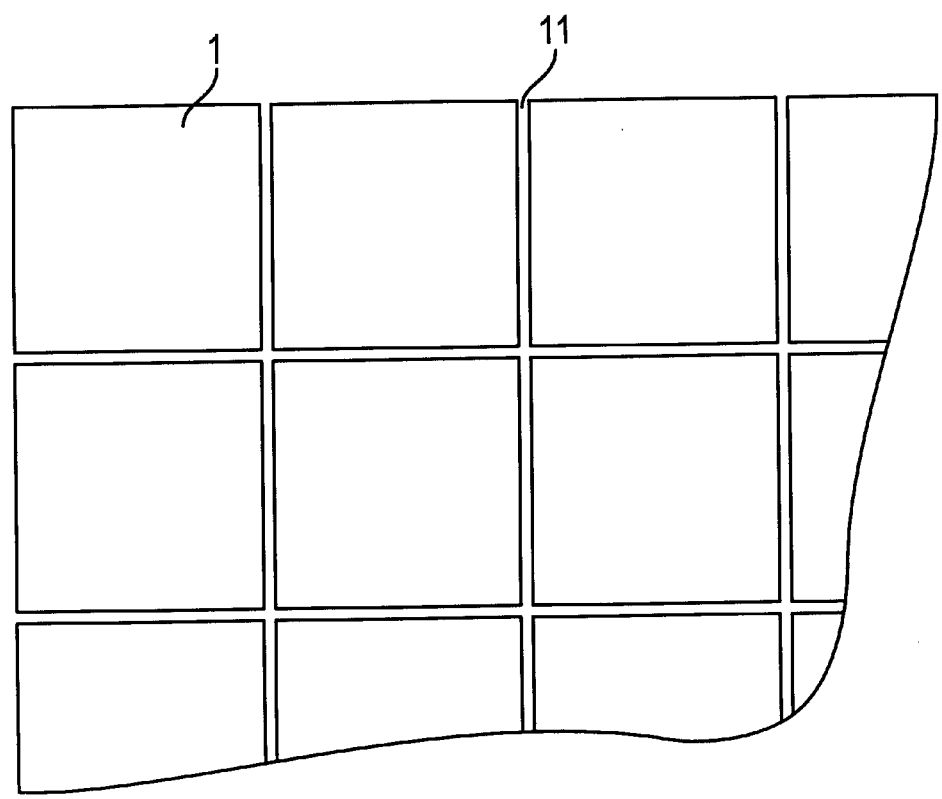
Figure 3:
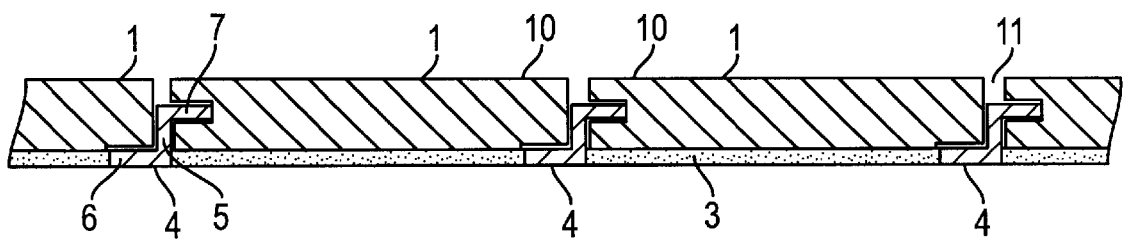
Figure 4:
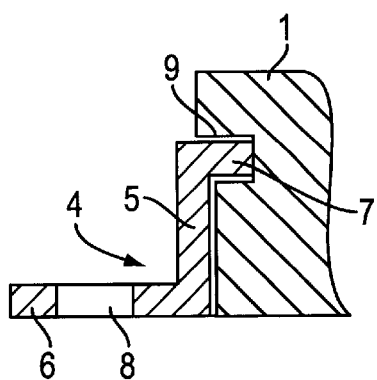
Figure 5:
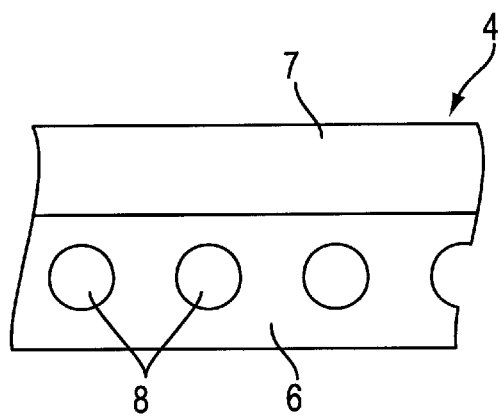
Figure 6:
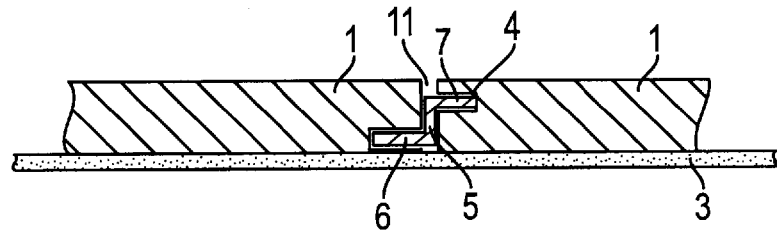
Figure 7A:
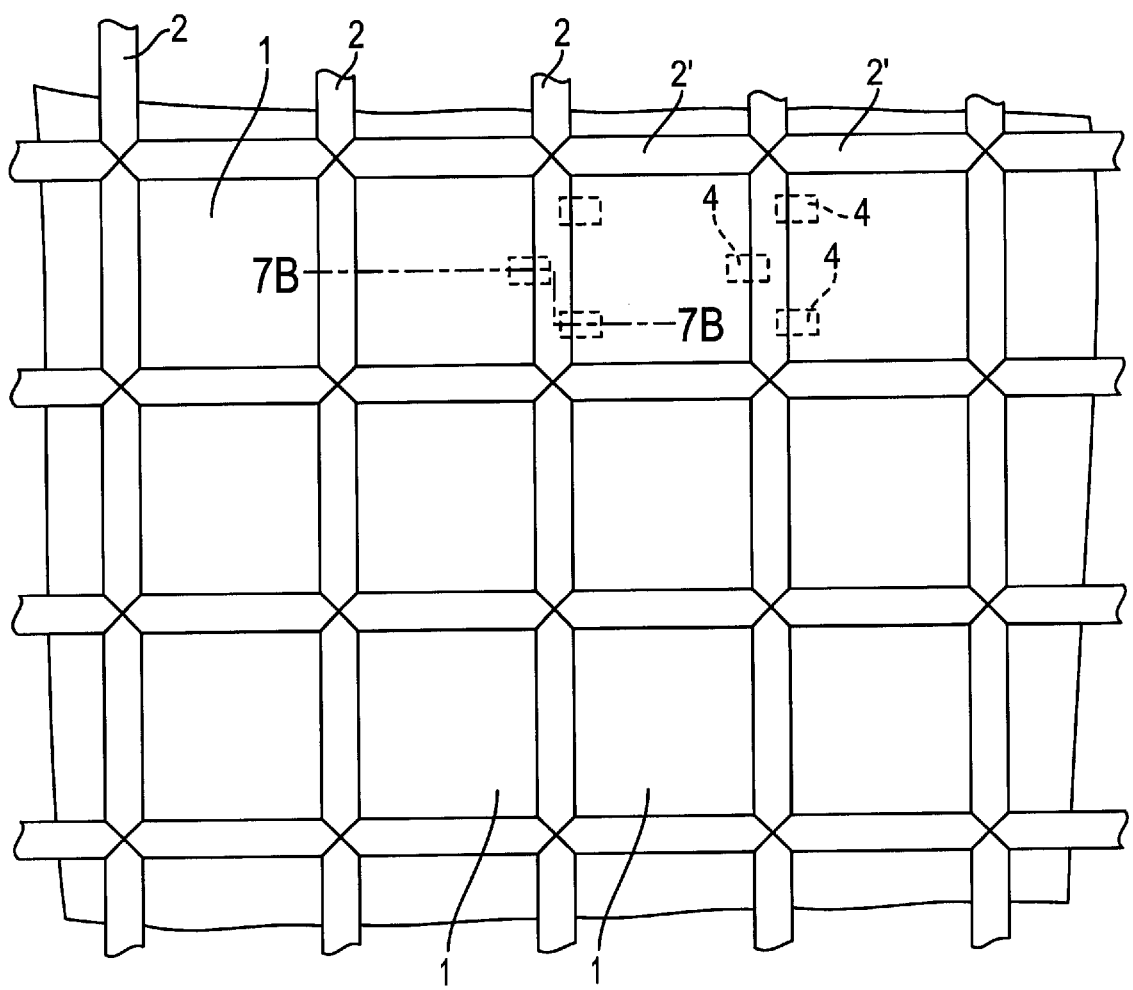
Figure 7B:
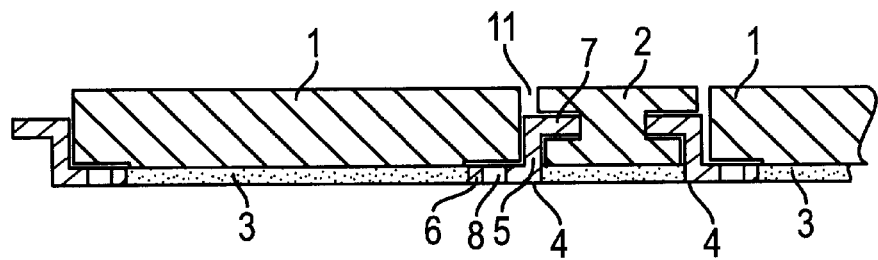
Figure 7C:
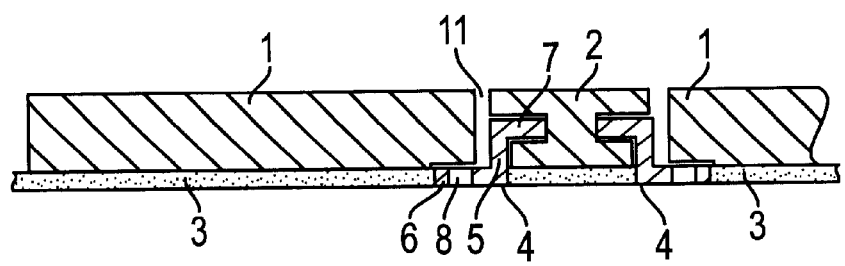
Figure 8:
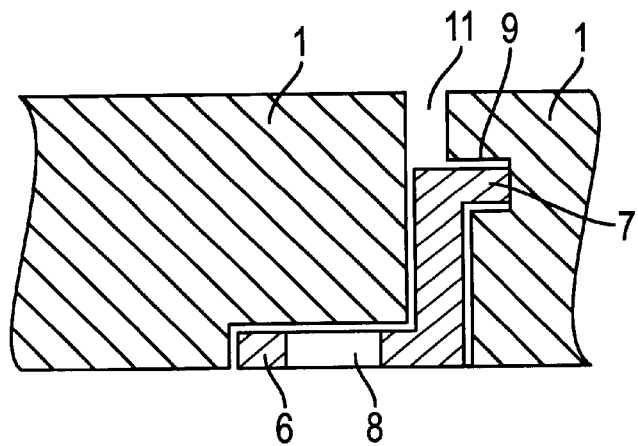
Figure 14:
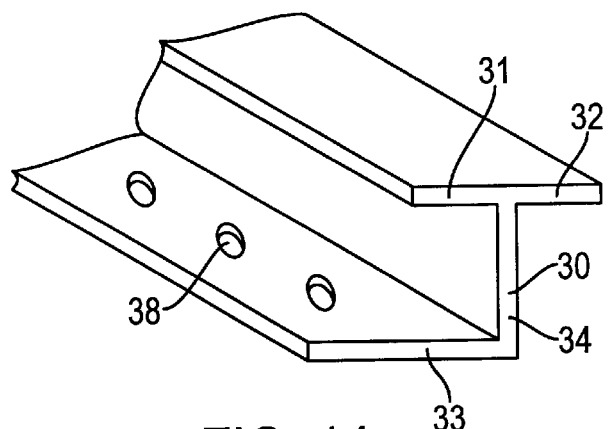

FIG. 1 shows a cross-section through a retaining element according to the invention with a panel according to the invention;

FIG. 2 shows a plan view of an arrangement according to the invention:

FIG. 3 shows a cross-section through the arrangement in FIG. 2;

FIG. 4 shows a detail from FIG. 3, on a larger scale;

FIG. 5 shows a plan view of the retaining element according to the invention from FIG. 3;

FIG. 6 shows a cross-section through a further embodiment of an arrangement according to the invention;

FIG. 7A shows a plan view of a further arrangement according to the invention;

FIG. 7B shows a cross-section through the arrangement of FIG. 7A;

FIG. 7C shows a section through a further arrangement according to the invention;

FIG. 8 shows a detail of a further embodiment of an arrangement according to the invention;

FIG. 9 to FIG. 14 show sections through further embodiments, according to the invention, of arrangements;

FIG. 14 shows a further retaining element according to the invention and

Figure 15:
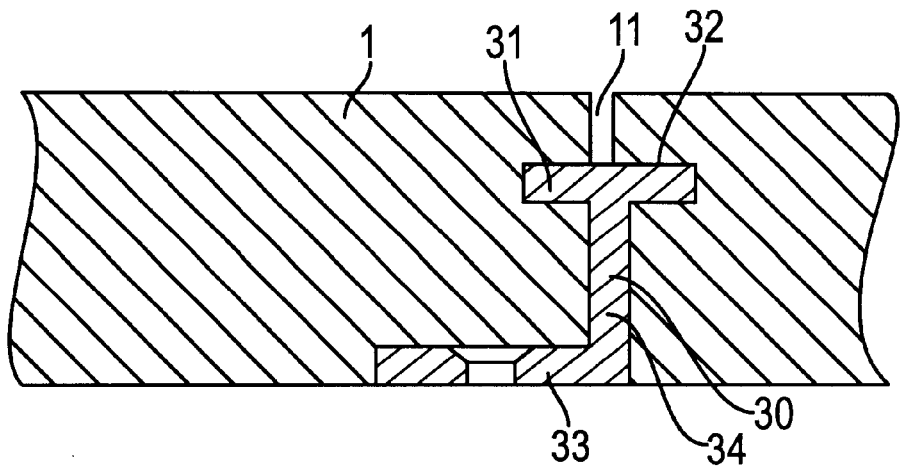
Figure 16:
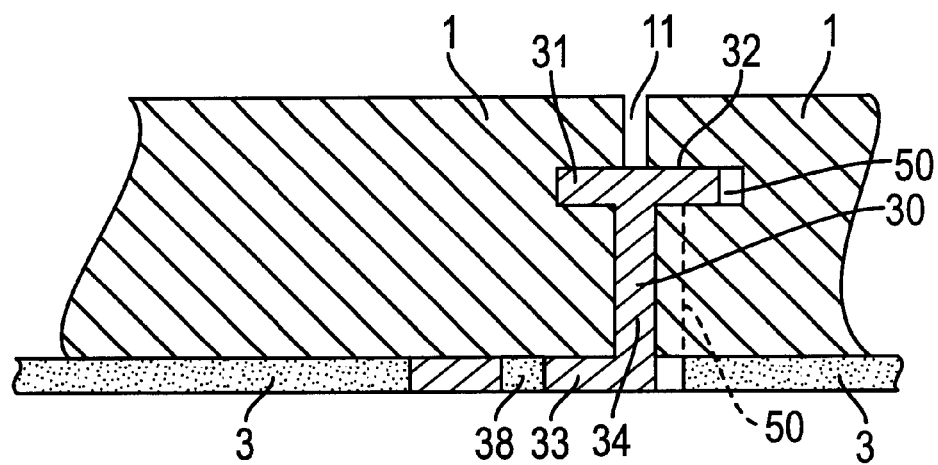

FIG. 15 and 16 show embodiments, according to the invention, of arrangements according to FIG. 14.

FIG. 1 shows, in cross-section, a retaining element 4 according to the invention, which is suitable in particular for two extensive construction elements adjacent to one another, such as, for example, floor panels, wall panels, facade claddings or the like, according to the invention. The retaining element 4 has a middle part 5, from both ends of which limbs 6, 7 project essentially perpendicularly in different directions. Various versions of this retaining element are possible for the purposes of the invention. Thus, the retaining element 4 may be realized in the form of a continuous strip having the profile shown in FIG. 1, very great variation being possible also with regard to the material used; depending on the strength desired, it may be made of metal, plastic or wood. However, the retaining element 4 may also be merely flat, for example bent from metal wire, in the shape shown in FIG. 1, and several of these retaining elements may be used along the end surfaces of the extensive construction elements.

Furthermore, the retaining element may be formed in its longitudinal dimension in such a way that it extends only over sections of the end surfaces of the construction elements.

In the embodiment of an arrangement according to the invention, shown in FIG. 2, extensive construction elements 1, such as, for example, a floor covering, wall panelling, a facade or the like, are laid in a plane. A gap 11 whose width is defined by the thickness of the middle part 5 of the retaining elements 4 is left between the individual construction elements. However, in the case of flush laying, this gap may also be omitted so that the end surfaces of the extensive construction elements 1 directly abut one another.

As is evident from FIG. 3, a cross-section through FIG. 2, construction elements 1 are held in a bed 3 of mortar, adhesive or the like. Retaining elements 4 are also held in this mortar bed 3, the middle part of each retaining element 5 being arranged between the end surfaces of the construction elements 1. The resulting apparent joint permits only a limited expansion movement in the plane of the arrangement. One limb 7 of the retaining elements 4 is arranged a smaller distance away from the visible surface 10 of the arrangement, which constitutes a common outer surface of the construction elements, than the other limb 6 of the retaining elements 4. In this example, a further variant of the invention is realized in that the limb 7 closer to the common top surface is inserted into the end surface of the construction elements 1, preferably into a recess, in this case a groove 9 (FIG. 4). This may equally be a blind hole or another recess, depending on the shape of the retaining elements 4. Furthermore, it is evident from FIG. 3, corresponding to another variant of the invention, that the limb 6 further away from the common top surface is held in a substrate for the arrangement, in this example the mortar bed 3. Consequently, the retaining element 4 is very well fixed in its position. As a result of this, a loss of level due to sinking of a construction element during laying is prevented, However, the limb 6 of the retaining elements 4 can also be fixed to the substrate by a screw, nail or other connection so that the respective other limb 7 of the retaining element 4 can hold the adjacent construction element 1 at the same level.

For this purpose, as is evident from FIG. 4 and FIG. 5, the limbs 6 can be provided with passages 8 so that, on laying in a still moist mortar bed 3, mortar can pass through the passages 8 in order to produce a particularly intimate and strong connection between the mortar bed 3 or the floor and the retaining element 4.

According to another further development of the invention, the end surfaces of the construction elements 1 are recessed in the support region of the limbs so that improved guidance of the retaining elements 4 results (FIG. 4). The middle part 5 of the retaining element 4 projects beyond the upper end surface of the construction element 1 to the extent required for fixing a desired width of the gap 11 between adjacent panels 1. Here too, if the middle part 5 of the retaining element 4 is recessed to a sufficient depth in the end surface, an expansion joint can be created between the construction elements 1 so that expansions between the construction elements can be compensated therein.

FIG. 6 shows a further embodiment of an arrangement according to the invention, a retaining element 4 being arranged with one of its limbs 6 in the end surface of the adjacent construction element 1 and with its other limb 7 in the end surface of the adjacent construction element 1, and the middle part 5 leaving a gap 11 between the construction elements, which however acts only as an apparent joint.

FIG. 7A shows an arrangement according to the invention, in which a narrow sheet-like construction element 2, 2' is arranged in each case between two extensive construction elements 1.

These narrow strips 2, 2' each frame a construction element 1 and thus give an aesthetic surface arrangement. The two elements consist of different material: thus, for example, the extensive construction elements 1 may be made of stone, for example marble, granite or the like, and the construction elements 2. 2' framing them may be made of another material, e.g. wood. In this way, a very wide range of materials can be used to create many combinations, which can be used, for example, for wall or for floor design. The problem with such arrangements lies in the very different properties of the materials of the construction elements 1 and 2. 2', for example in the case of thermal expansion or expansion due to humidity. Thus, it is possible that, in an arrangement laid in this manner, the wood construction elements 2, 2' swell at high humidity and thus cause the stone construction elements 1 to burst if there is insufficient expansion latitude between the construction elements 1 and 2, 2'. In order to prevent this, retaining elements 4 are arranged between the construction elements and are inserted with the limb 7 in the construction element 2. 2' and rest with their other limb 6 under a construction element 1. A further problem of fixing the wood invisibly to the floor without adhesively bonding it is likewise solved by this type of arrangements.

FIG. 7B shows a cross-section through the arrangement in FIG. 7A. The sheet-like construction elements 1 are bonded to the substrate, for example in a mortar or adhesive bed, in such a way that they receive limbs 6 of retaining elements 4 with passages 8 between the substrate and their adhesive side and are thus firmly bonded to the substrate. The other limbs 7 of the retaining elements 4 are each inserted into the recess in the construction element 2, 2', for example a groove, so that the construction element 2, 2' is held in its position by the retaining elements 4 but rests freely on the substrate without an adhesive or mortar layer in between. The gap between the construction elements 1 and 2 or 2' is established in the form of an apparent joint by means of the middle part 5 of the retaining element 4.

In FIG. 7C, in a slightly modified embodiment, the middle part 5 is made so narrow that it does not project beyond the end surface of the construction elements 2 and a continuous gap 11 therefore results between the construction element 1 and 2. However, this recess can also be provided in the construction element 1. Owing to this gap 11 and the lack of a connection between the construction elements 2 and the substrate, an expansion movement caused, for example, by heat or humidity can take place unhindered, with the result that this movement cannot have an destructive effect. As a result of this, in particular, the shear movement between substrate and construction element which is produced by the expansion is decoupled in such a way that no stresses dangerous to the adjacent elements can occur.

Furthermore, FIG. 8 shows an enlarged detail of a further embodiment according to the invention, in which the construction element 1 is recessed at the bottom on the side of the limb 6 of the retaining element 4 in order to receive the limb 6 of the retaining element 4 so that said limb is flush with the lower surface. This is particularly advantageous in the case of a thin adhesive mortar layer. Once again, passages 8 are provided in the limb 6, through which passages the adhesive mortar can penetrate.

Figure 9:
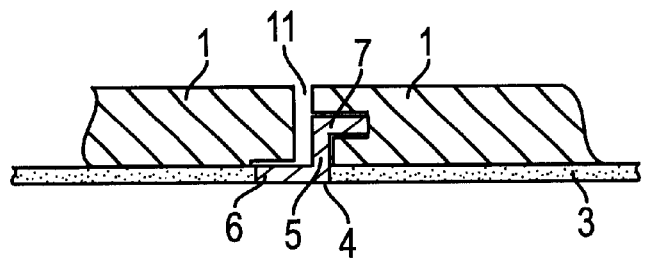

FIG. 9 shows an example with an expansion joint in an arrangement according to FIG. 2, a gap 11, which also actually permits an expansion movement, being left between the construction elements 1. This is achieved, as in FIG. 7C, by virtue of the fact that the middle part 5 of the retaining element 4 disappears in a recess in the construction element 1 and thus leaves the gap 1 free for the expansion movement. Furthermore, here the limb 7 of the retaining element 4 is let into a further recess in the end surface of the construction element 1. Here too, sinking of the construction elements 1 in the mortar bed 3 is prevented by the retaining elements 4, so that unevenness of the floor has no effects on level laying.

Figure 10:
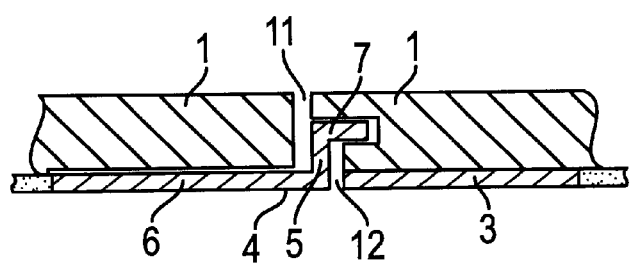

In a further modification thereof, FIG. 10 shows an arrangement which has an expansion joint 11 but also has a further space in the retaining element 4 in that a gap 12 is provided between the middle part 5 and the construction element 1 receiving the latter. This provides an even better possibility for compensating for expansion movements.

Figure 11:
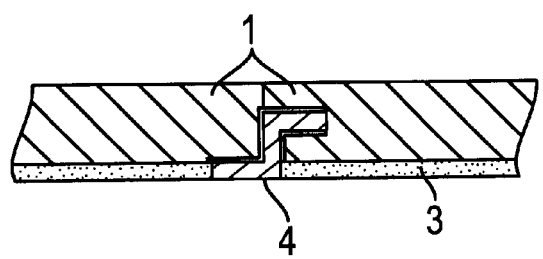

In contrast, the arrangement shown in FIG. 11 is a so-called arrangement carried out by flush laying, in which the end surfaces of the extensive construction elements 1 directly abut one another so that there is no gap at all. The retaining element 4 used for level laying is—as shown—held in a concealed manner in recesses on one side of abutting construction elements 1 but may also rest in recesses provided on both sides of the abutting construction elements.

Figure 12:
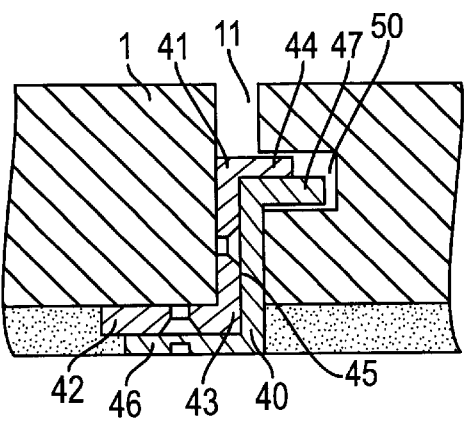

FIG. 12 shows a further embodiment of the invention in which a limb 46 of a retaining element 40 is fastened to the substrate—in this case by a screw connection—and the other limb 47 engages a recess 50 in the construction element 1. During laying, an adjacent construction element 1 with retaining element 41 attached thereto is arranged next to a construction element 1 in such a way that the limbs 46 and 42, 45 and 43 as well as 47 and 44 rest against one another. The limb 44 engages the recess 50 so that construction element 1 is brought to a position level with the adjacent construction element 1. The resulting gap 11 is an apparent joint.

Figure 13:
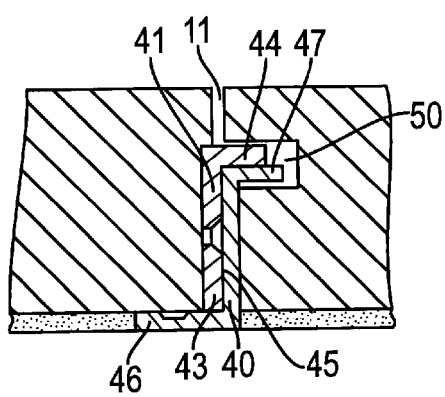

FIG. 13 shows a variation of the example shown in FIG. 12, limb 41 of the retaining element being held by an undercut so that a narrower gap 11 can be formed.

FIG. 14 shows a retaining element 30 according to the invention, which —viewed in cross-section—has a middle part 34, from one end of which a first and second limb 31, 32 project essentially perpendicularly in different directions and from the other end of which a further limb 33 projects essentially parallel to one of the other two limbs. An increase in the stability of the connection is thus achieved, with the result that levelness is ensured even in the case of heavy extensive construction elements 1.

FIGS. 15 and 16 show sections through an arrangement according to the invention with the use of a retaining element 30 according to FIG. 14, the middle part 34 being arranged between the end surfaces of the construction elements 1, and the first and second limbs 31, 32 of all retaining elements 30 being arranged a small distance away from the visible surface of the arrangement than the further limb 33 of all retaining elements 30. In the example according to FIG. 15 and 16, this results in an apparent joint whose spacing is determined by the thickness of the middle part 34. After joining, the retaining elements 30 are no longer detectable when viewed from the visible side of the construction elements 1.

In a variant of the invention, the limbs 31 and 32 are inserted in a recess in the end surfaces of the adjacent construction elements 1. These recesses may be grooves, blind holes or the like. This also depends on the design of the retaining elements 30, which may be, for example, elongated in the form of strips or in the form of bent wire elements. The guidelines already mentioned above for the retaining element according to FIG. 1 are also applicable to this with regard to the material. Thus, each of the limbs 33 supports the construction elements I on the substrate, the limbs 31 and 32 engaging the end surfaces of the adjacent construction elements 1 in such a way that these are secured as in FIG. 16 at the same level and prevented from sinking in the mortar bed 3. As a result of this support on the substrate, mixed forms of the substrate may be used in all embodiments of the invention, for example a strip of mortar and a strip of adhesive or a strip of mortar and solid substrate, etc. can be used alternately in succession. Levelness is thus achieved by the retaining elements according to the invention, independently of the substrate used.

In FIGS. 15 and 16, the fixation chosen for the retaining element is one in which the limb 33 is held on its substrate for the arrangement by, for example, being screwed there or being anchored in a mortar bed. Here, the joint 11 can be established in a particularly simple manner as an expansion joint which is invisible from the visible side of the construction elements, and this can be done on one side—as indicated by the dashed line at 50 —or on both sides. It is also possible to embed the limbs 33 according to the variant shown in FIG. 16, the limbs 33 being provided with passages 38 which are filled with mortar in the inserted state of the retaining elements 30, with the result that a better connection with the mortar bed 3 can be produced.

Furthermore, in the example according to FIG. 15, the end surface of the construction elements 1 is recessed in the support region of the limbs 33 so that the latter do not project.

In a further development of the invention, in the case of the embodiment described above, the construction element shown on the right in each of the drawings, for example construction elements 2 in FIG. 7B and 7C, can be simply laid on the substrate without the use of a bed 3 or laid a distance away from the substrate—i.e. in a floating arrangement—which permits the retaining element design according to the invention.

As already mentioned several times, the invention is not restricted in its many aspects to the use of the material described at the outset. Thus, the inventive aspect with frame and filling also covers variants with recessed tiles or stone tiles which are held in an interlocking manner by the wood or are adhesively bonded thereto. Furthermore, an application of the relevant articles or processes independently of the preceding measures is possible.

What is claimed is:

1. A floor or wall tile in the form of a panel, comprising a frame and a filling, wherein the frame and the filling are nondetachably connected in a utility state to form an integral part, and wherein the connection between frame, and filling interlocks tongue and groove-like, and wherein said frame extends beyond said filling in the plane of the tile at least the thickness of the frames and wherein the filling is of the same thickness as the frame.

2. The tile according to claim 1, wherein the filling comprises 30 to 70 percent by volume of said panel and fulfills at least one of the following conditions:

less than 20 percent of the filling has a grain size lower than 2 mm;

the granulatory of the filling essentially corresponds to Fuller's curve with three grain sizes between 0 and 1.5 mm;

organic fiber material is present in up to about 60 percent by volume of which less than 20 percent by volume have a fiber length larger than 3 mm;

inorganic material is present in about 10 to 70, percent by volume and has a grain size of less than 1.5 mm.

3. The construction element according to claim 2, wherein the filling further comprises at least one of the following:

0 to 18 percent by weight of pigments;

about 2 to about 40 percent by weight of swelling materials;

about 0.01 to 1 percent by weight of finely powdered casein;

about 0.01 to 1 percent by weight of polyphosphates;

about 0.01 to 3 percent by weight of linseed oil;

calcium hydroxide in an amount of about 30 percent by weight of the linseed oil.

4. The tile according to claim 1, wherein the frame, viewed in cross-section, has, on a side facing the filling, a recess or protuberance, increasing its contact surface.

5. The tile according to claim 4, wherein the frame has on a side facing the filling (3) a protuberance formed from a material selected from the group consisting of a corrugated strip arranged all around on the side facing the filling and pins which are a distance apart and are inserted into that side of the frame which faces the filling.

6. The tile according to claim 1, wherein a lattice which extends over an entire inner surface of the frame within the filling (3) reinforces the filling.

7. The tile according to claim 1, wherein the filling is formed from hardenable materials.

8. The tile according to claim 7, in which the filling comprises a dye.

9. The tile according to claim 7, wherein the filling is selected from the group consisting of concrete, plastic, wood concrete and a magnesite composition.

10. The tile according to claim 7, wherein the frame is made from a material selected from the group consisting of wood, metal, plastic and stone.

11. Process for manufacturing a tile according to claim 7 from a hydraulically setting material, comprising the steps of:

placing a release agent or a release mat on a support surface;

placing a frame describing an area on top of the release agent or release mat;

introducing the material into the frame in a liquid or pasty state;

at least one of leveling and vibrating the material; and allowing the material to harden and dry.

12. The process according to claim 11, further comprising:

flushing both sides of the filling as uniformly as possible with air during hardening or drying.

13. The process according to claim 12, further comprising:

placing the panel in an approximately horizontal position during the first hardening step until the filling material has reached intrinsic stability, and bringing the panel into an approximately perpendicular position to undergo final hardening.

14. The process according to claim 11, further comprising:

treating at least one side of the panel after the final hardening step by at least one of the methods selected from the group consisting of grinding and impregnating.

15. The process according to claim 12, further comprising keeping the air at a constant atmospheric humidity value.

16. The process according to claim 11, further comprising:

sucking down the release mat through holes by means of a vacuum generated in an interior of a hollow retaining apparatus to hold the frame and the release mat.

17. The process according to claim 11, further comprising:

freeing the frame from the release mat after reaching sufficient intrinsic strength of the material, reaching and further hardening the material.

18. The process according to claim 11, further comprising using a resilient release mat.

19. The tile according to claim 1, wherein the frame and filling comprise different materials.

20. The tile according to claim 1, wherein the frame has vent channels for escape of air during filling.

21. The tile according to claim 1, in which the extension of the frame in the plane of the tile is about two to four times the thickness of the frame.

* * * * *